United States Patent
Jegodtka

(10) Patent No.: US 10,832,562 B2
(45) Date of Patent: Nov. 10, 2020

(54) METHOD AND UNMANNED VEHICLE FOR TESTING FIRE PROTECTION COMPONENTS

(71) Applicant: MINIMAX GMBH & CO. KG, Bad Oldesloe (DE)

(72) Inventor: Thomas Jegodtka, Henstedt-Ulzburg (DE)

(73) Assignee: Minimax GmbH & Co. KG, Bad Oldesloe (DE)

( * ) Notice: Subject to any disclaimer, the term of this patent is extended or adjusted under 35 U.S.C. 154(b) by 0 days.

(21) Appl. No.: 16/317,225

(22) PCT Filed: Jun. 19, 2017

(86) PCT No.: PCT/EP2017/064948
§ 371 (c)(1),
(2) Date: Jan. 11, 2019

(87) PCT Pub. No.: WO2018/010915
PCT Pub. Date: Jan. 18, 2018

(65) Prior Publication Data
US 2019/0291866 A1     Sep. 26, 2019

(30) Foreign Application Priority Data

Jul. 12, 2016 (DE) .................. 10 2016 212 643
Mar. 14, 2017 (DE) .................. 10 2017 204 261

(51) Int. Cl.
*G08B 29/14* (2006.01)
*B64C 39/02* (2006.01)
(Continued)

(52) U.S. Cl.
CPC .......... *G08B 29/145* (2013.01); *B64C 39/024* (2013.01); *G08B 17/00* (2013.01);
(Continued)

(58) Field of Classification Search
CPC ............ B64C 39/024; B64C 2201/127; B64C 2201/027; B64C 2201/12; B64D 47/08;
(Continued)

(56) References Cited

U.S. PATENT DOCUMENTS

2015/0246727 A1*   9/2015   Masticola ............ G08B 29/145
                                                                                  701/2

FOREIGN PATENT DOCUMENTS

| CN | 101361104 A | 2/2009 |
| DE | 10 2012 003 190 A1 | 8/2013 |
| WO | WO 2017/093839 A1 | 6/2017 |

OTHER PUBLICATIONS

Office Action with English translation, Chinese Application No. 201780043626.2, 11 pages (dated Mar. 31, 2020).
(Continued)

*Primary Examiner* — Hoi C Lau
(74) *Attorney, Agent, or Firm* — Perkins Coie LLP

(57) ABSTRACT

The invention relates to a method for testing a fire protection component (1) of a fire protection structure (11). The method comprises the steps (a) providing an unmanned vehicle (2), (b) navigating the unmanned vehicle (2) by means of a navigation control unit (3) of the unmanned vehicle (2) to the fire protection component (1), at which a test is to be performed, and (c) performing the test on the fire protection component (1) by means of a testing device (20) of the unmanned vehicle (2). The invention furthermore relates to an unmanned vehicle (2) for testing a fire protection component (1) of a fire protection structure (11) as well as a fire protection system comprising such an unmanned vehicle for carrying out the method according to the invention.

27 Claims, 11 Drawing Sheets

(51) Int. Cl.
  *G08B 17/00*    (2006.01)
  *G08B 29/16*    (2006.01)
  *G08B 29/18*    (2006.01)
  *G08B 17/06*    (2006.01)
(52) U.S. Cl.
  CPC ............. *G08B 17/06* (2013.01); *G08B 29/16* (2013.01); *G08B 29/188* (2013.01); *B64C 2201/027* (2013.01); *B64C 2201/12* (2013.01); *B64C 2201/127* (2013.01)
(58) Field of Classification Search
  CPC .. B64D 47/06; B64B 1/40; B64B 1/06; G01D 18/00; G08B 29/145; G08B 29/16; G08B 29/188; G08B 17/00; G08B 17/06; G08B 29/185
  See application file for complete search history.

(56) References Cited

OTHER PUBLICATIONS

International Search Report with English translation, International Application No. PCT/EP2017/064948 (published under WO 2018/010915 A1), 7 pages (dated Nov. 30, 2017).
Written Opinion with English translation, International Application No. PCT/EP2017/064948 (published under WO 2018/010915 A1), 13 pages (dated Nov. 30, 2017).

\* cited by examiner

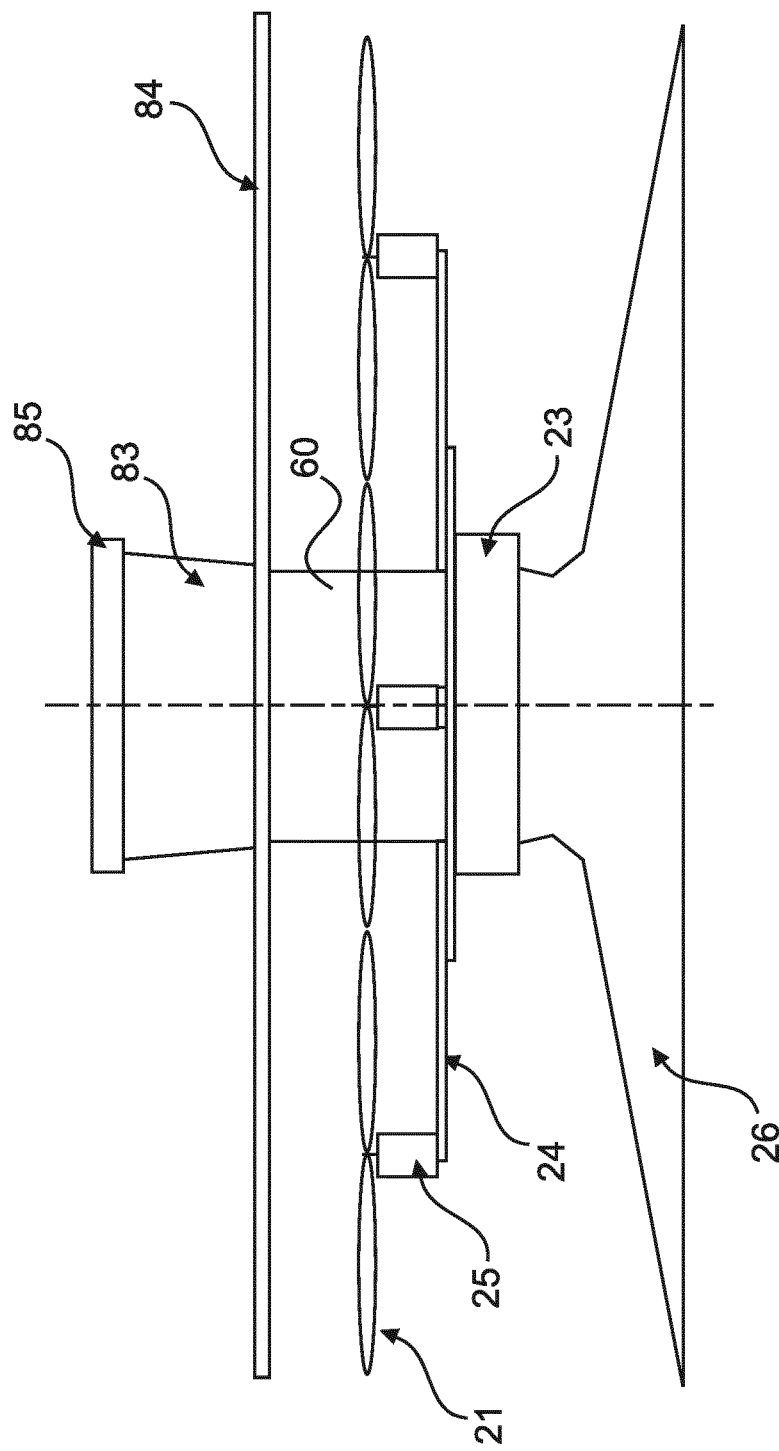

METHOD AND UNMANNED VEHICLE FOR TESTING FIRE PROTECTION COMPONENTS

PRIORITY CLAIM AND INCORPORATION BY REFERENCE

This application is a 35 U.S.C. § 371 application of International Application No. PCT/EP2017/064948, filed Jun. 19, 2017, which claims the benefit of German Application No. 10 2016 212 643.1 filed Jul. 12, 2016, and German Application No. 10 2017 204 261.3 filed Mar. 14, 2017, each of which is incorporated by reference in its entirety.

TECHNICAL FIELD

The invention relates to a method for testing a fire protection component of a fire protection structure, an unmanned vehicle for testing a fire protection component of a fire protection structure as well as a fire protection system.

BACKGROUND OF THE INVENTION

Fire protection structures of various designs are known from the prior art. In the embodiment as fire detection structures, which comprise, for example, fire detectors, detector devices and a control center as fire protection components, this type of fire protection structure serves for the early detection of a fire, in order to initiate countermeasures, such as, for example, calling the fire department and initiating the evacuation of individuals, after a fire detection.

In the embodiment of the fire protection structure as extinguishing structure, the fire protection structure serves to extinguish the fire. In a combined fire detection and extinguishing structure, the extinguishing structure is controlled by the control center, preferably a fire detector and/or extinguishing control center, after the fire detectors of the fire detection structure have detected a fire, and the detected fire is extinguished by means of the extinguishing structure.

Extinguishing structures can comprise, for example, numerous fire protection components, embodied as extinguishing structure components, such as, for example, sprinklers, nozzles, valves or valve stations, other armatures as well as pipelines and extinguishing agent containers.

To ensure the constant operational readiness and reliability of the fire protection components of a fire protection structure, a test of the fire protection components needs to be performed according to national rules and/or national or international standards at regular intervals.

The test is performed as part of the necessary maintenance and can comprise, for example, visual controls of fire protection components and/or test triggering of fire protection components, for example of fire detectors.

In Germany, this is established for example for fire detectors by DIN 14665 (edition 2012) and DIN-VDE 0833 Part 1 (edition 2009) and Part 2 (edition 2010). DIN-VDE 0833 Part 1 (2009) dictates, for example, that an on-site inspection of the danger detector structure, for example a fire detection structure, has to take place four times a year to test the fire detection structure, in particular the fire protection components, such as fire detectors, for visible animalities, for example for external damage or contamination or for changes to the ambient conditions. This is possible, for example, by means of a test of the fire protection components by a visual inspection and can be realized in the prior art for example by means of a visual control in response to a test by the service or the maintenance personnel.

For example DIN-VDE 0833 Part 2 thus formalizes that the operator needs to routinely test, whether the free space around the fire detectors is maintained. For example, neither equipment nor stored goods must not be located within a distance of less than 0.5 m from the detector. Such objects in close proximity of a fire detector can result in that the propagation of a fire parameter towards the fire detector is prevented or weakened, so that the fire detector cannot detect a fire. This test is also realized in the prior art for example by means of a visual control in response to a test by the service or maintenance personnel.

DIN-VDE 0833 Part 1 further dictates that functional tests are performed at least once a year on all fire detectors, which can be tested in a destruction-free manner. These are, for example, smoke detectors, combustion gas detectors, flame detectors, aspirating smoke detectors, multi-sensor detectors.

Visual controls for sprinklers are specified, for example, in the standards DIN EN 12845, CEA 4001, NFPA 25 and FM 2-81.

For example smoke detectors are thus triggered at least once a year by the service personnel or maintenance personnel, respectively, by means of a tester, which delivers an aerosol as test parameter into the measuring chamber of the smoke detector by manual operation, is triggered, and the results of this test triggering are captured. All other types of fire detectors need to be manually triggered as well, and, depending on the type of the fire detector (e.g. smoke detector, gas detector, flame detector), other testers are necessary, which can create a test parameter, which is adequate for the detector type and which can lead to the test triggering of the fire detector.

A fire detector structure generally furthermore comprises different types of fire detectors, which react to different measuring principles with different sensors, so that a variety of testers with different test parameters needs to be held available by the service personnel or maintenance personnel, respectively, and needs to be brought along in response to the test.

Fire detectors are installed in buildings and/or areas, which are at risk, for example in a factory building, predominantly at a height, to which the service personnel or maintenance personnel, respectively, does not reach without aids, such as ladders or lifting platforms.

A number of disadvantages for the test methods for fire protection components known from the prior art thus result:
high expenditure of personnel, time and costs;
for testing, a variety of testers needs to be held available and brought along to test-trigger fire detectors;
the test is prone to errors, or even fraudulent tests by manual and faulty recording of the test results or by omitting the test, respectively, are possible, respectively.

SUMMARY OF THE INVENTION

In light of the foregoing, the invention was based on the object of developing a method for testing a fire protection component of a fire protection structure as well as an unmanned vehicle for testing a fire protection component of a fire protection structure, which overcomes the mentioned disadvantages from the prior art as much as possible. In particular, a cost-efficient, quick and/or versatile test method and a universal unmanned vehicle is to be provided for this purpose. The invention was furthermore based on the object of performing the test on fire protection components, which are mounted at a great height, in an efficient, reliable manner and without endangering the service or maintenance personnel. The danger is created by working at a great height on ladders or lifting platforms.

According to a first aspect of the invention, the mentioned object is solved by means of a method for testing a fire protection component of a fire protection structure comprising the features of claim 1. Advantageous designs and preferred embodiments of the method for testing a fire protection component of a fire protection structure are described in the corresponding subclaims 2 to 8 and in the description below.

In a first aspect of the invention, the solution relates to a method for testing a fire protection component of a fire protection structure. The method comprises the following steps:
a) providing an unmanned vehicle;
b) navigating the unmanned vehicle by means of a navigation control unit of the unmanned vehicle to the fire protection component, at which a test is to be performed; and
c) performing the test on the fire protection component by means of a testing device of the unmanned vehicle.

Testing is understood to be maintenance measures, in particular the analysis of the outward appearance of fire protection components and the surrounding area thereof, in particular of fire detectors or extinguishing structure components, for example of sprinklers, by means of capturing images and/or image data, analogously to the visual control and/or for example the test triggering of fire protection components, preferably of fire detectors.

The unmanned vehicle can hereinafter also be referred to as vehicle.

The unmanned vehicle has a navigation control unit, which is embodied and/or configured for navigating the vehicle. The navigation of the vehicle can thus take place in an automated manner by means of the corresponding navigation control unit. The navigation control unit can thus navigate to this target, for example on the basis of a specified target, such as, for example the position of the fire protection component in a protection area, which is protected by the fire protection structure. The target can be or will be specified by means of target data. This target data can be stored by the navigation control unit or the vehicle or can be transmitted to the navigation control unit by means of a signal. The navigation control unit or the vehicle can be embodied accordingly for this purpose. The vehicle can have a drive, which can be controlled directly and/or indirectly by the navigation control unit. If a test of the fire protection component is to now be performed, the vehicle can navigate independently and/or in an automated manner to the fire protection component by means of the navigation control unit. This provides the advantage that the vehicle also navigates to the correct fire protection component. This is so, because corresponding target data can be or will be specified.

According to a first embodiment of the method, the unmanned vehicle is navigated to the fire protection component in such a way in step b) that the unmanned vehicle is arranged in a test position, which is assigned to the fire protection component.

One or preferably also a plurality of assigned test positions can thus be provided for each fire protection component. It is ensured thereby that test positions, which enable a test and which are assigned to the different types of the fire protection components, for example for fire detectors and for extinguishing structure components, are specified, which is to be performed. The different types of the test, for example the analysis of the outward appearance of fire protection components and the surrounding area thereof, in particular of fire detectors or extinguishing structure components, for example of sprinklers, by means of the capturing of images and/or image data by means of the testing device or for example the test triggering of fire protection components, preferably of fire detectors, can require different assigned test positions, which the unmanned vehicle needs to assume for performing the test.

With the assigned test position, for example the unhindered occurrence of created test parameters, in particular a sufficient quantity of the test parameter, is made possible for the successful test triggering of fire detectors, in particular different types of fire detectors. The assigned test position makes it possible that the test parameter reaches the sensor or the sensors of the fire detector preferably via the shortest route and within the shortest possible time, in order to attain a test triggering of the fire detector. For a successful test triggering, it is required that a sufficient quantity of the test parameter reaches the sensor or the sensors of the fire detector.

The analysis of the outward appearance of fire protection components and/or the surrounding area thereof by capturing images and/or image data is preferably conducted efficiently by specifying an assigned test position, because obstacles and specific features of the installation location of the fire protection component can be considered in this way.

In a further embodiment of the method, the fire protection structure has a plurality of fire protection components, for each of which a test is provided. For this embodiment, the method steps b) and c) are performed one after the other, for each of the fire protection components as the respective fire protection component, for which a test is to be performed.

This has the advantage that the test can be performed one after the other for all fire protection components of a fire protection structure, for which a test is to be performed, without aids, such as ladders or lifting platform, in a cost-optimized and efficient manner with the unmanned vehicle, in particular by using only one testing device.

In a further embodiment of the method, the or each fire protection component is embodied as a fire detector and/or an extinguishing structure component. The fire detector is or the fire detectors are preferably embodied preferably as smoke detector and/or heat detector and/or flame detector and/or spark detector and/or an aspirating smoke detector and/or as gas detector.

The extinguishing structure component is preferably embodied as a sprinkler, a nozzle, a valve, a valve station, another armature, a pipeline or an extinguishing agent container. These embodiments of the fire protection components will furthermore also be referred to as type of the fire protection component, a flame detector or a smoke detector or a sprinkler or a valve is thus for example a type of the fire protection component. The fire detectors preferably have a fire parameter inlet opening, via which fire parameters can reach the sensor or the sensors, respectively, of the fire detector, so that the latter can detect a fire. Fire parameters are for example smoke aerosols, electromagnetic radiation of flames or sparks, combustion gases or heat radiation from the source of the fire.

In a further embodiment of the method, the unmanned vehicle is embodied as a robot, in particular a robot crawler. The robot crawler is able, for example by means of the movement with the help of a plurality of articulated arms, preferably with multi-link 6 to 8 articulated arms, to transport the testing device across vertical and horizontal obstacles, for example along pipelines mounted to the ceiling, to fire protection components, such as, for example, sprinklers, nozzles or pipe connection elements. This has the advantage that the test can be performed quickly and cost-efficiently on fire protection components, which cannot be accessed easily or which cannot be accessed at all, respectively, by service or maintenance personnel.

In a particularly preferred embodiment of the method, the unmanned vehicle is embodied as an unmanned aircraft, in particular as a drone. A particularly advantageous embodiment of the unmanned aircraft or of the drone is for example a multicopter, such as, for example, a quadrocopter or an octocopter. Such multicopters provide the advantage that they can hold and/or stand at any position in the room. This allows for a particularly simple navigation to the fire protection component to be tested, and in particular for assuming the assigned test position for performing the test of the fire protection component.

The unmanned vehicle preferably has a computer unit, a memory and/or a first signal transmitting and/or receiving unit. The computer unit preferably serves for controlling the drive of the unmanned vehicle. This computer unit furthermore controls in particular the performance of the test of the fire protection components. The memory preferably comprises position coordinates of the fire protection components, in particular the test position assigned to the fire protection component to be tested, or a plurality of assigned test positions, and/or a list with the fire protection components, which are to be tested. Data, which documents the performance of the test for each fire protection component to be maintained, is documented particularly preferably in this memory.

In a further embodiment of the method, the method step a1) is performed between step a) and step b). A navigation control signal is received in step a1), for example by a remote control device, by means of a first signal transmitting and/or receiving unit of the unmanned vehicle. The navigation of the vehicle in step b) takes place on the basis of this navigation control signal.

The remote control device can for example be embodied as smartphone, tablet, PC or service device. The remote control device preferably has a third signal transmitting and/or receiving unit for exchanging data and/or signals by means of the first signal transmitting and/or receiving unit of the unmanned vehicle, preferably signals for navigating and/or data and/or signals for performing the remote controlled test of the fire protection components.

It is an advantage of the remote controlled maintenance with the unmanned vehicle, in particular with a drone that the person, who activates the remote control device, can react directly to unforeseen environmental conditions in the nearby surroundings of the fire protection components.

In an alternative embodiment of the method, the navigation in step b) takes place independently by means of the navigation control unit. This has the advantage that an efficient and automated test of all provided fire protection components can be performed.

In a further alternative embodiment of the method, the navigation in step b) takes place by means of a combination of the navigating of the unmanned vehicle on the basis of the navigation control signal and the independent navigation by means of the navigation control unit. The advantage of this method alternative is the option of the intervention by the service or installation personnel in response to unforeseen environmental conditions in the nearby surroundings of some fire protection components, in order to nonetheless successfully perform the test on these fire protection components by means of the remote control.

In a further embodiment alternative of the method, the fire protection component has a second signal transmitting and/or receiving unit and a data memory with stored identification data. This identification data serves to characterize and/or to identify the fire protection components. The method is hereby characterized by step b1): wireless transmission of the identification data to the unmanned vehicle by means of the second signal transmitting and/or receiving unit. This method step b1) is preferably performed prior to step c). The test in step c) is thereby performed on the basis of the identification data.

The identification data represent or have a type of the fire protection component, an article number of the fire protection component, production data of the fire portion component, a production date of the fire protection component, a serial number of the fire protection component, a software version of the fire protection component, a date of the last test of the fire protection component, test parameter data of the fire protection component, position data of the fire protection component and/or a test position assigned to the fire protection component.

With the transmission of the identification data to the unmanned vehicle, it receives the relevant information for selecting, which type of test needs to be performed on the fire protection component. By means of the transmission of the type of the fire protection component, it is determined, for example, whether only the analysis of the outward appearance of this fire protection component and the surrounding area thereof is to be performed in method step c) by capturing images and/or image data and/or also for example the test triggering by this fire protection component.

In a further embodiment, the second signal transmitting and/or receiving unit is embodied as radio identification means, for example as NFC or RFID tag, and method step step b1) is started by an excitation signal, which is transmitted by the unmanned vehicle to the fire protection component when the unmanned vehicle approaches the fire protection component.

After receiving the identification data, the unmanned vehicle preferably switches into the mode for the independent navigation. The unmanned vehicle navigates in particular to the assigned test position.

Method step c) is preferably triggered by an activation signal SA, which activates the testing device and which is generated by the remote control device and/or the computer unit of the vehicle after step b). This preferably takes place after the assigned test position has been assumed.

In a preferred alternative of the method, the testing device has a checking device for generating a test parameter KT, wherein the checking device has a test parameter exit for an exit of the test parameter KT. In step c), the checking device preferably generates a test parameter KT, which exits through the test parameter exit. In the fire protection component, which is embodied as fire detector, the test parameter KT generates a fire detector signal SB and/or a light signal of an optical display device on the fire detector. The optical display device is preferably embodied as LED. The fire detector signal SB is preferably sent to the unmanned vehicle and/or to a control center, preferably a fire detector and/or extinguishing control center, and/or to the remote control device. This fire detector signal SB is preferably captured as check acknowledgement signal ST. As test parameter KT, an aerosol stream is preferably generated by an aerosol generator, and/or a test gas is generated by a gas generator, and/or an electromagnetic radiation is generated by a source of radiation, and/or a heat radiation is generated by a heat generator, and/or a switch signal is generated by a switch signal generator.

As switch signal generator, the check device preferably has a permanent magnet or an electromagnet, which, in response to approaching the fire protection component, activates a reed switch, which generates a switch signal, and which is located on or in the fire protection component and preferably triggers a testing process. The activation of the reed switch in a fire detector to be tested can for example switch an alarm resistor into the alarm circuit of the fire detector switch and thus generate a test signal, which is preferably sent to a fire detector control center.

In a further embodiment alternative of the invention, the testing device has an image capturing device, which is embodied for capturing an image and for generating image data, which represents the captured image. This is the basis for the following additional embodiment alternative of the method, in which step c) has the following partial steps:
- capturing an image of the fire protection component;
- generating image data, which represents the captured image; and
- determining a functionality of the fire protection component.

The determining of the functionality of the fire protection component preferably takes place on the basis of the image data by means of the testing device. For this purpose, an image evaluation or image comparison, respectively, is performed with the help of comparison data stored in the memory of the vehicle.

In an alternative embodiment of the method, the testing device also has an image capturing device, which is embodied for capturing an image and for generating image data, which represents the captured image, wherein step c) has the following partial steps:
- capturing an image of the fire protection component;
- generating image data, which represents the captured image; and
- transmitting the image data to a control center and/or the remote control device and
- determining a functionality of the fire protection component on the basis of the image data, preferably by means of the control center and/or the remote control device.

For this purpose, an image evaluation or image comparison, respectively, is performed with the help of comparison data stored in the control center and/or the remote control device. In the alternative, the image evaluation is performed visually by the service or maintenance personnel.

The image capturing device is preferably embodied and/or configured for capturing the light signal of the optical display device of the fire detector with further image data. This is significantly more reliable than the visual control when visually conducting the test by visual control in response to on-site inspection, because the fire detectors are often mounted at a great height, which makes it more difficult to recognize the glowing of an LED when a test is triggered. The stored image data and the stored further image data, which is preferably stored as well, furthermore represents a secure and traceable documentation of the test, which is a significant advantage as compared to visually conducting the visual control as part of the testing in response to an on-site inspection.

In a further embodiment of the method, the checking device has a rotatable, pivotable and/or length-adjustable aligning device, on which the test parameter exit is arranged, and wherein the method is further characterized by the step b2): aligning the test parameter exit in the direction of the fire protection component by means of the aligning device. The method step b2) is preferably performed prior to step c).

In a further preferred embodiment of the method, the checking device generates a test parameter KT, preferably after receiving the activation signal SA. As test parameter KT, an aerosol stream KT1 is hereby preferably generated by the aerosol generator, and/or a test gas KT2 is generated by the gas generator, and/or an electromagnetic radiation KT3 is generated by the source of radiation, and/or a heat radiation KT4 is generated by the heat generator, and/or a switch signal is generated by the switch signal generator, wherein preferably two, three or four different test parameters KT are furthermore generated, in particular synchronously or one after the other, by the checking device. The selection of the test parameter preferably takes place by means of the transmitted identification data, in particular the type of the fire protection component and/or the test parameter data.

This has the large advantage that, depending on the type of the fire protection component, in particular on the type of the fire detector, the correct test parameter, which leads to the test triggering of the fire detector, is selected quickly and reliably.

According to a second aspect of the invention, the above-mentioned object is solved by means of an unmanned vehicle comprising the features according to claim 9. Advantageous embodiments and further developments can be found in subclaims 10 to 25, as well as the subsequent information in the description and the figure description.

With regard to the unmanned vehicle according to the second aspect of the invention, reference is made analogously to the preceding explanations, preferred embodiments, preferred features, advantages and/or effects, as they have been discussed accordingly for the method according to the first aspect of the invention.

The unmanned vehicle for testing a fire protection component of a fire protection structure comprises a testing device for performing the test of the fire protection component and of a navigation control unit, which is embodied and/or configured for navigating the unmanned vehicle to the fire protection component at which a test is to be performed. The vehicle is embodied and/or configured for performing the test of the fire protection component after reaching the fire protection component by means of the testing device.

In an embodiment of the unmanned vehicle, the navigation control unit is embodied and/or configured for navigating the unmanned vehicle to the fire protection component in such a way that the unmanned vehicle is arranged in a test position, which is assigned to the fire protection component.

A further advantageous embodiment of the vehicle is characterized in that the fire protection structure has a plurality of fire protection components, for each of which a test is provided, and the navigation control unit is embodied and/or configured for navigating the unmanned vehicle one after the other to each of the fire protection components. The vehicle is hereby embodied and/or configured for performing the test of the fire protection components one after the other by means of the testing device.

The or each fire protection component is preferably embodied as a fire detector and/or an extinguishing structure component.

A further advantageous embodiment of the vehicle is characterized in that the unmanned vehicle is embodied as an unmanned aircraft, a drone or a robot, in particular a robot crawler. The unmanned vehicle preferably has a computing unit, a memory and/or a first signal transmitting and/or receiving unit.

A further advantageous embodiment of the vehicle is characterized in that the first signal transmitting and/or receiving unit is embodied for receiving a navigation control signal, in particular from a remote control device, and the navigation control unit is embodied and/or configured for navigating the unmanned vehicle to the fire protection component or one of the fire protection components, in particular to the respective test position, in particular to the assigned test position, on the basis of the navigation control signal.

The navigation control unit is preferably embodied and configured for independently navigating the unmanned vehicle, or, in the alternative, for independently navigating the unmanned vehicle and for navigating the vehicle on the basis of the navigation control signal.

A particularly preferred embodiment of the vehicle is characterized in that the first signal transmitting and/or receiving unit or a further signal transmitting and/or receiving unit of the unmanned vehicle is embodied for the, in particular wireless receiving of an identification signal, which represents identification data for characterizing and/or identifying the or the at least one fire protection component, and the unmanned vehicle is embodied and/or configured for performing the test of the respective fire protection component on the basis of the corresponding identification data. The identification data preferably represents a type of the fire protection component, an article number of the fire protection component, production data of the fire protection component, a production date of the fire protection component, a serial number of the fire protection component, a software version of the fire protection component, a date of the last test of the fire protection component, test parameter data of the fire protection component, position data of the fire protection component, and/or an assigned test position of the fire protection component, and/or the identification data has it.

In a further embodiment of the vehicle, the first signal transmitting and/or receiving unit or the further signal transmitting and/or receiving unit are embodied and/or configured for receiving the identification signal from a radio identification means, in particular an NFC tag or an RFID tag, of the fire protection component. The vehicle is preferably further embodied and/or configured for transmitting the results of the test, preferably data of the test results, and/or the date of the test, to the radio identification means. This provides the advantage that this data can then be stored there and is available in response to a subsequent test.

A further advantageous embodiment of the vehicle is characterized in that the unmanned vehicle is embodied and/or configured for generating an activation signal SA, in particular when the unmanned vehicle reaches the respective fire protection component and/or the corresponding test position, and the unmanned vehicle is embodied and/or configured for activating the test of the respective fire protection component, when and/or as soon as the activation signal SA is generated.

A further preferred embodiment of the vehicle is characterized in that the testing device has an image capturing device, which is embodied and/or configured for capturing an image and for generating corresponding image data of a fire protection component, which had been reached before, and the testing device is preferably embodied and/or configured for determining a functionality of the fire protection component on the basis of the image data. The image data is preferably stored in the testing device or in the vehicle. To determine the functionality of the fire protection component, an image evaluation or image comparison, respectively, is performed with the help of comparison data stored in the memory of the vehicle. The analysis of the outward appearance of fire protection components and the surrounding area thereof, in particular of fire detectors or extinguishing structure components, such as sprinklers, is conducted by detecting images and/or image data. The functionality is derived directly or indirectly from the image data. The image of a defective glass ampule of a sprinkler is thus a direct feature for a lack of the functionality. An object in the vicinity, e.g. closer than 0.5 m to a fire detector, is an indirect indication for the lack of functionality.

An alternative embodiment of the vehicle is characterized in that the testing device has an image capturing device, which is embodied and/or configured for capturing an image and for generating corresponding image data of the fire protection component, which has been reached before. The vehicle is embodied and/or configured for transmitting the image data, in particular by means of the first signal transmitting and/or receiving unit, to a control center and/or the remote control device. The image data is preferably stored there. This makes it possible to perform an image evaluation or image comparison, respectively, with the help of comparison data stored in the control center and/or the remote control device. In the alternative, the image evaluation is performed visually by the service or installation personnel.

A further preferred embodiment of the unmanned vehicle is characterized in that the testing device has a checking device for generating a test parameter. The checking device has a test parameter exit for an exit of the test parameter. The checking device comprises for example an aerosol generator, a gas generator, a source of radiation, a heat generator and/or a switch signal generator. For performing the test, the checking device is configured and/or embodied for generating the test parameter, which can preferably be output through the test parameter exit.

The devices for generating test parameters will be referred to hereinafter as test parameter generators. The checking device thus preferably has test parameter generators. The test parameter generators can preferably be exchanged. This has the advantage that, after a complete usage or failure of the test parameter-generating means, such as, for example, the test gas or the test aerosols, the test parameter generator can be exchanged and the checking device is available again quickly for tests.

The checking device is preferably embodied and/or configured for generating the test parameter, for example after receiving the activation signal SA. As test parameter, for example an aerosol stream can be generated by the aerosol generator, and/or a test gas can be generated by the gas generator, and/or an electromagnetic radiation can be generated by the source of radiation, and/or a heat radiation can be generated by the heat generator, and/or a switch signal can be generated by the switch signal generator. The test parameter is generated and used to perform a test triggering of the fire detector, which is to be tested. The test parameter preferably forms the corresponding fire parameter, which forms the basis for the respective measuring principle of the detector to be tested and which can trigger the fire detector.

In a preferable embodiment of the unmanned vehicle comprising several test parameter generators, the checking device is embodied and/or configured for in particular synchronously or sequentially generating two, three or four different test parameters KT. This has the advantage that multi-sensor detectors and/or different types of fire detectors, such as smoke detectors, gas detectors, heat detectors, or flame detectors can be tested with only one unmanned vehicle.

In a further preferable embodiment of the unmanned vehicle, the checking device is embodied and/or configured for controlling the generation of the at least one test parameter on the basis of the identification signal, in particular on the test parameter data of the respective fire protection component, in particular a temporal sequence of the generation and/or outputting of the test parameters, provided that a plurality of test parameters KT is provided. This is in particular advantageous for multi-sensor detectors, for example for a combined smoke, heat and carbon monoxide detector. The test parameters necessary for the respective sensors for triggering the test can then be generated here in a specified temporal sequence. To test each sensor of such a multi-sensor detector, the triggering of three tests on the detector can thus also be realized.

In a further preferred embodiment of the unmanned vehicle, the checking device has a rotatable, pivotable and/or length-adjustable aligning device, on which the test parameter exit is arranged. The unmanned vehicle, in particular the checking device, is embodied and/or configured for controlling the aligning device, in order to align the test parameter exit, in particular to or relative to the respective fire protection component. The test parameter exit is hereby preferably arranged on an end section of the aligning device facing away from the vehicle.

This has the advantage that for example in the embodiment of the unmanned vehicle as a drone, the air movement and turbulences, which are caused by the rotary wings, impact the propagation of the test parameter less.

The alignment of the test parameter exit by means of the aligning device is helpful to attain that, after exiting from the test parameter exit, the test parameter reaches the fire detector parameter inlet opening of the fire detector, preferably via the shortest route and within the shortest possible time, so as to attain a test triggering of the fire detector. For a successful test triggering, it is required that a sufficient quantity of the test parameter reaches the sensor or the sensors of the fire detector through the fire parameter inlet opening. The air volume between the test parameter exit and the fire parameter inlet opening, in which the test parameter can propagate, represents the test parameter propagation volume. The smaller this test parameter propagation volume, the larger the likelihood that a sufficient quantity of the test parameter reaches the sensor or the sensors of the fire detector through the fire parameter inlet opening and a test is triggered for testing the fire detector. For example an aerosol stream, which is preferably created by emitting a compressed test gas with test aerosols, may possibly propagate in the surrounding area of the fire detector in the case of an unlimited test parameter propagation volume in such a way that no sufficient quantity of the test parameter reaches the sensor or the sensors of the fire detector through the fire parameter inlet opening, in order to create a test triggering. For example the creation and/or use of a defined test parameter propagation volume is advantageous to prevent this.

This is implemented in a further advantageous embodiment of the unmanned vehicle. The unmanned vehicle hereby has a shielding device. The shielding device is preferably embodied for embodying a defined test parameter propagation volume around the fire protection component. The defined test parameter propagation volume preferably forms a propagation volume for the test parameter, which is virtually sealed against the ambient air of the fire protection component. The test parameter thus propagates virtually only or exclusively in the formed defined test parameter propagation volume.

The shielding device preferably encloses the test parameter exit of the checking device and a fire parameter inlet opening of a fire detector and is embodied for creating a defined test parameter propagation volume. The shielding device preferably channels the test parameter KT, in particular the aerosol stream KT1, in particular test aerosol and/or the test gas KT2, from the test parameter exit to the fire parameter inlet opening.

As exemplary embodiment of the shielding device, a cap or a funnel attachment is proposed, which is either pushed completely over the fire detector, against the ceiling, to which the fire detector is fastened, or is attached to the fire detector housing in such a way that at least one fire parameter inlet opening is enclosed.

The shielding device is preferably made of an elastic material or has a sealing edge, for example of silicon, so that, when pressing the shielding device against the ceiling, the test parameter can virtually propagate only or completely in the formed defined test parameter propagation volume.

In an embodiment of the unmanned vehicle as drone comprising one or a plurality of rotary wings, the shielding device has a projection surface perpendicular to the axes of rotation of the rotary wings. This projection surface at least partially overlaps the surface passed over by the rotary wings, viewed in the direction of the axes of rotation of the rotary wings. This shielding device is preferably embodied to shield the rotary wings or wing of the drone against air flow with a direction opposite to a virtually perpendicular flight direction. This prevents or reduces, respectively, for example a suction effect when the drones approach a ceiling in the protection area, in particular when approaching a fire protection component, which is mounted to the ceiling. In a particularly preferred embodiment of the shielding device, the latter is embodied as funnel attachment for this purpose, which is preferably arranged above the rotation planes of the rotary wings. The diameter of the funnel wall, which increases in the perpendicular flight direction, causes the funnel attachment, in particular the shape of the outer wall to deflect the air flow particularly effectively, in order to reduce or prevent the suction effect.

In a further preferable embodiment of the unmanned vehicle, the shielding device has a first shielding element and a second shielding element. The first shielding element is embodied for embodying the defined test parameter propagation volume. The second shielding element has the projection surface perpendicular to the axes of rotation of the rotary wings, which at least partially overlaps the surface passed over by the rotary wings, viewed in the direction of the axes of rotation of the rotary wings. The first shielding element is preferably embodied as the described cap and the second shielding element for example as disk, which is preferably arranged above the rotation planes of the rotary wings.

In a further preferred embodiment of the unmanned vehicle, the checking device or the unmanned vehicle for controlling the aligning device is embodied and/or configured for positioning the shielding device on the fire detector or on a ceiling, to which the fire detector can be mounted in such a way that the defined test parameter propagation volume can be embodied, wherein the fire detector is hereby completely or partially encompassed by the shielding device, preferably in such a way that at least one or all fire parameter inlet openings is located or are located within the defined test parameter propagation volume.

The shielding device has a wall comprising an inner and outer wall, wherein the inner wall comprises an opening. The shielding device preferably has a cylindrical cap shape, a shape as hollow sphere segment or the shape as truncated cone and thus an opening preferably in the shape of a circle. Prior to outputting the test parameter, this opening is placed over the fire detector.

In a further preferred embodiment of the unmanned vehicle, the latter is embodied and/or configured for storing data of the test results, in particular in the memory of the vehicle. The data of the test results preferably comprise image data of the tested fire protection components and/or data, which represents the successful test triggering of fire protection components, embodied as fire detectors, as well as preferably the date of the test performance. This data preferably further comprises identification data of the tested fire protection components.

To read out the test results, in particular after concluding the test of all fire protection components of the fire protection structure selected or specified for this purpose, the unmanned vehicle preferably has an interface. The data of the test results can be copied in a maintenance database in a wired or wireless manner. The maintenance database is preferably stored in the control center, on a service device, a PC, a tablet, a notebook or another device.

The unmanned vehicle according to the second aspect of the invention and all described embodiments is preferably embodied and/or configured for carrying out a method for testing the at least one fire protection component of the fire protection structure according to one of claims 1 to 8.

According to a third aspect of the invention, the above-mentioned object is solved by means of a fire protection system. With regard to the components or devices, respectively, of the fire protection system according to the third aspect of the invention, reference is made analogously to the preceding explanations, preferred embodiments, preferred features, advantages and/or effects, as they have been discussed accordingly for the method according to the first aspect of the invention and/or for the unmanned vehicle according to the second aspect of the invention.

The fire protection system according to the invention comprises a fire protection structure comprising at least one fire protection component, an unmanned vehicle corresponding to the second aspect of the invention, according to one of claims 9 to 25, and a further device, in particular a control center, for example a fire detector and/or extinguishing control center, and/or a remote control device. The unmanned vehicle is embodied and/or configured for carrying out a method for testing the at least one fire protection component of the fire protection structure according to the first aspect of the invention, according to one of claims 1 to 8.

A preferred embodiment of the fire protection system is characterized in that the fire protection component is embodied as fire detector and that the unmanned vehicle has a testing device comprising a checking device, wherein the checking device is embodied and/or configured for generating a test parameter KT, wherein the fire detector is further embodied and/or configured for generating a fire detector signal SB and/or a light signal of an optical display device of the fire detector after a detection of the test parameter KT, wherein the fire detector signal SB is preferably sent to the control center, preferably to a fire detector and/or extinguishing control center.

The control center is preferably embodied and/or configured for capturing this fire detector signal SB as test acknowledgement signal ST. The control center is preferably further embodied and/or configured for being switched into a test mode prior to testing the at least one fire protection component. The image capturing device preferably captures the light signal from the optical display device at the fire detector. This is stored as successful performance of the test, in particular of the test triggering in the unmanned vehicle. Stored images of the light signal are understood to be data, which represents the successful test triggering of the fire protection component, embodied as fire detector.

The test mode of the control center is provided so that the control center, after receiving a fire detector signal SB, does not transmit a fire alarm signal to the fire department or another office in response to this, but captures this as test triggering.

In a preferred embodiment of the unmanned vehicle and of the fire protection system, the vehicle is embodied and/or configured for switching the control center, in particular the fire detector and/or extinguishing control center, into the test mode. For this purpose, the vehicle is preferably embodied and/or configured for transmitting a test mode signal, for example by means of the first signal transmitting and/or receiving unit, to the control center, in particular the fire detector and/or extinguishing control center, which preferably receives this test mode signal by means of a control center transmitting and/or receiving device.

Further features, advantages and possible uses of the present invention follow from the following description of the exemplary embodiments and the figures. All described and/or depicted features alone and in any combination thereby form the subject matter of the invention, also independently of their composition in the individual claims or the dependencies thereof. The same reference numerals furthermore represent the same or similar objects in the figures.

BRIEF DESCRIPTION OF THE DRAWINGS

FIG. 11 shows an embodiment of the unmanned vehicle as drone comprising a shielding device, which has two shielding elements, in a schematic illustration.

MODE(S) FOR CARRYING OUT THE INVENTION

Figure 1:
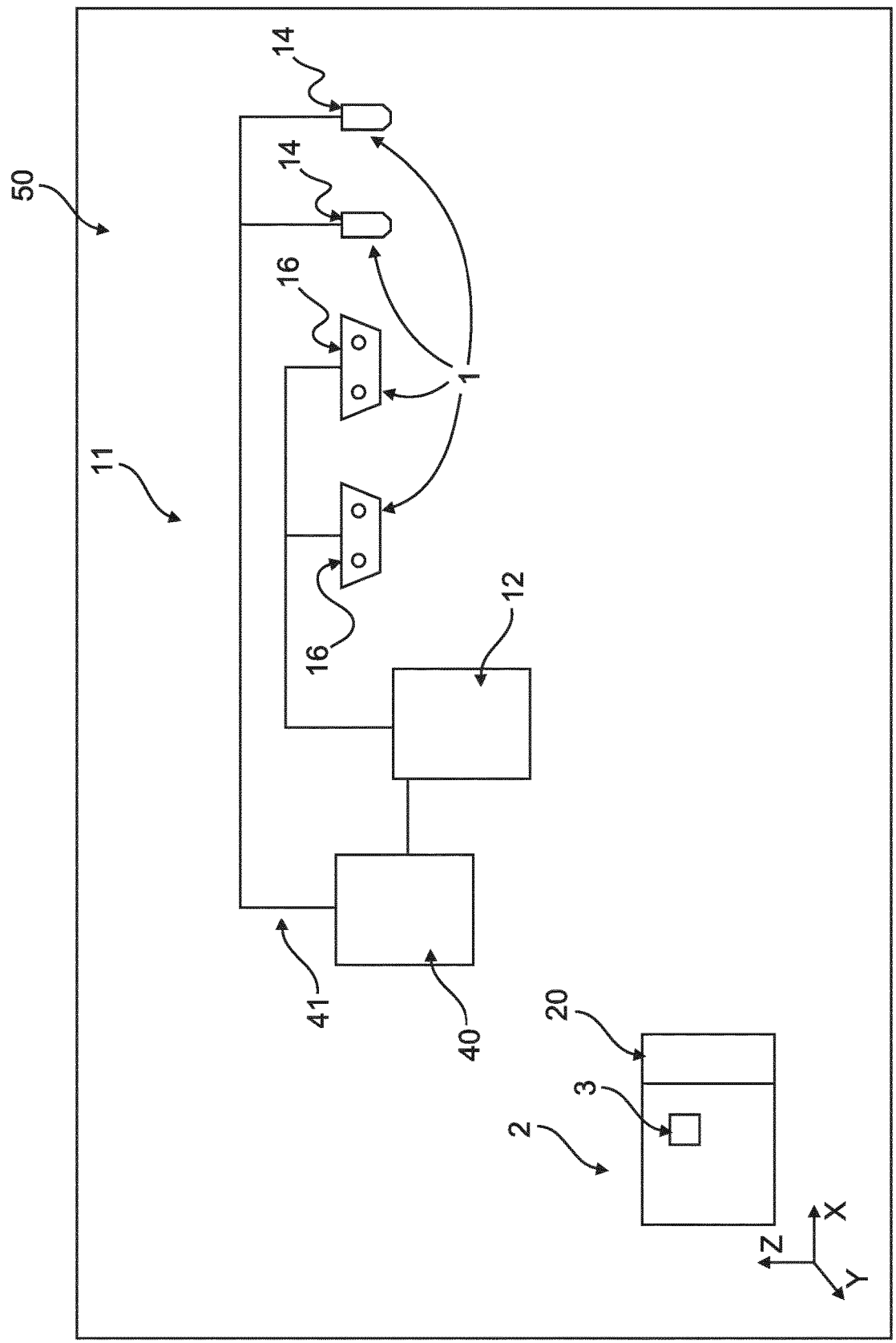
FIG. 1 shows the unmanned vehicle and the fire protection system in a schematic illustration.

An embodiment of the unmanned vehicle 2 for testing a fire protection component 1 of a fire protection structure 11, as well as the surroundings, in which it can be used for example, is illustrated schematically in FIG. 1. The fire protection component 1 to be tested is arranged in a fire protection structure 11, which monitors and protects the protection area 50. The illustrated fire protection structure 11 is for example a combined fire detection and extinguishing structure here. It comprises a fire detector and/or extinguishing control center 12, which is connected in a signal-conducting manner to the fire protection components 1, which are embodied as fire detector 16. The extinguishing structure comprises the extinguishing agent supply device 40, which are connected to fire protection components 1, which are embodied as extinguishing structure components 14, in this case as nozzles, via pipelines 41.

The unmanned vehicle 2 for testing a fire protection component 1 of a fire protection structure 11, comprises a testing device 20 for performing the test of the fire protection component 1 and a navigation control unit 3, which is embodied and/or configured for navigating the unmanned vehicle 2 to the fire protection component 1. The unmanned vehicle 2 is embodied and/or configured for performing the test of the fire protection component 1 by means of the testing device 20 after reaching the fire protection component 1.

Figure 2A:
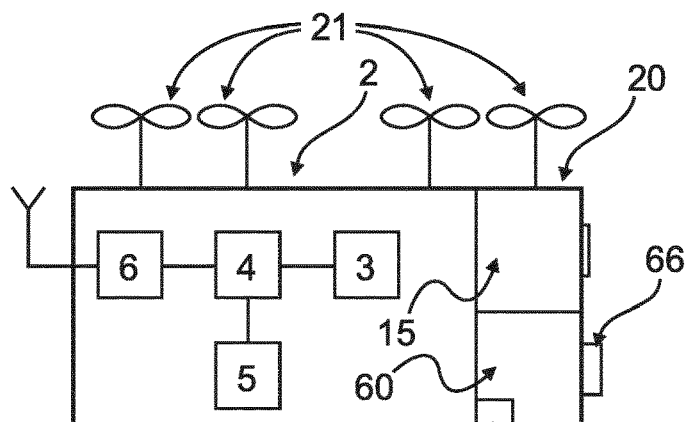
FIG. 2*a* shows the unmanned vehicle in an embodiment as drone in a schematic illustration.

FIG. 2 shows, schematically, exemplary embodiments of the unmanned vehicle 2. In FIG. 2a, the embodiment is illustrated as drone, here preferably embodied as quadrocopter. As quadrocopter, the drone has rotary wings 21. This multicopter provides the advantage that, as illustrated schematically in FIG. 3a, it can remain in a test position (xi, yi, zi), which is assigned to the fire protection component 1, in order to perform the test. In this exemplary embodiment, the fire protection component 1 is embodied as fire detector 16.

Figure 2B:
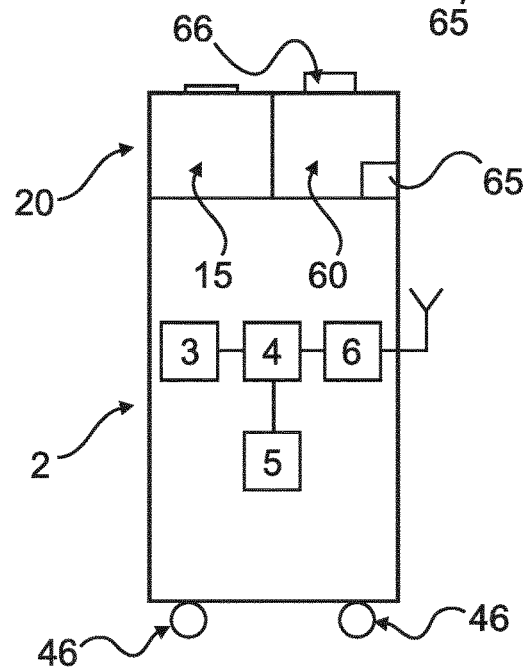
FIG. 2*b* shows the unmanned vehicle in an embodiment as robot in a schematic illustration.
Figure 5:
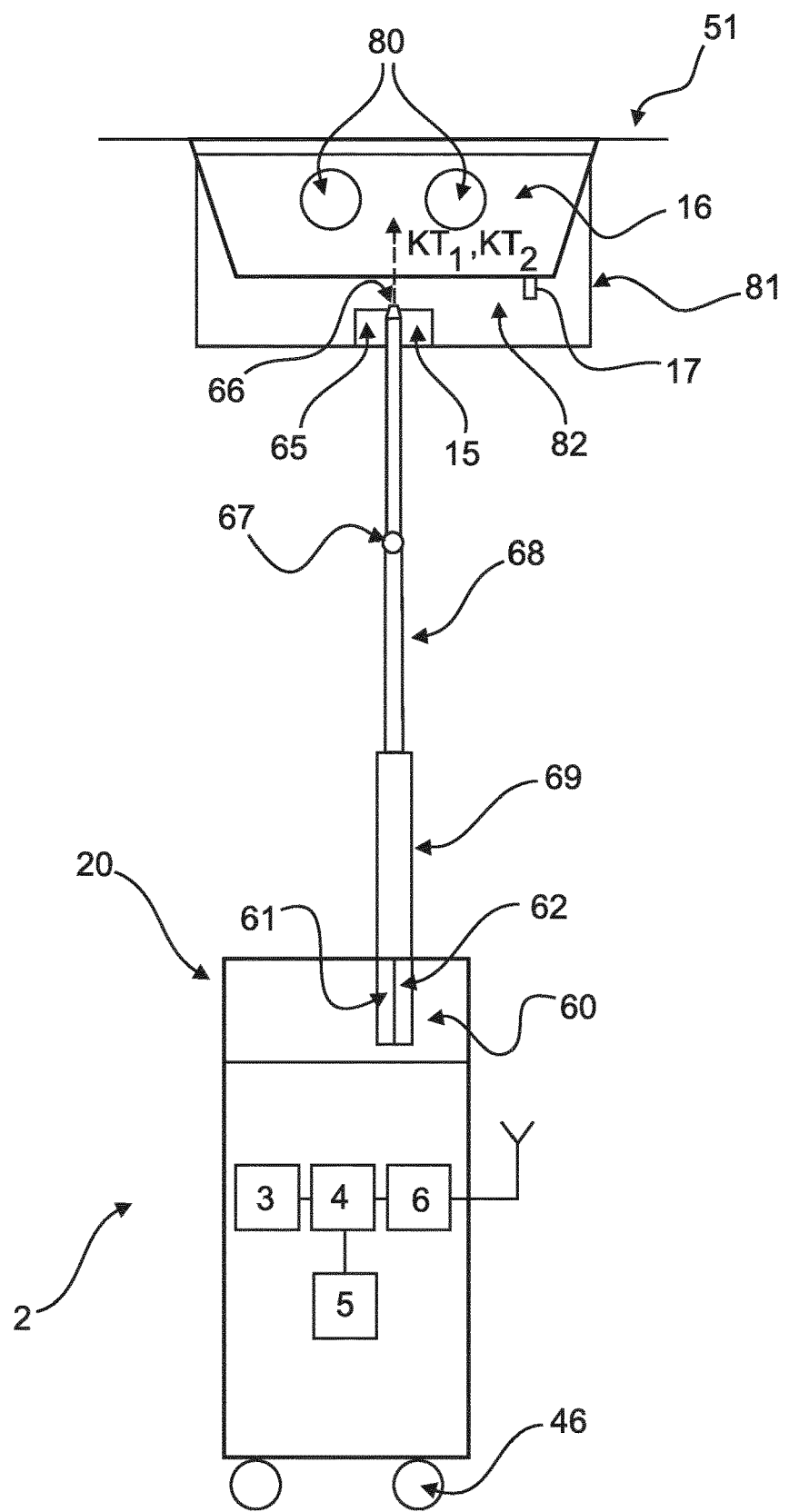
FIG. 5 shows an embodiment of the unmanned vehicle as robot in a schematic illustration.

The embodiment of the unmanned vehicle 2 as robot is illustrated schematically in FIG. 2b and FIG. 5. In order to move, said robot has four wheels 46, only two of which are illustrated. Embodiments with 3, 6 or 8 wheels or as tracked/caterpillar vehicle represent advantageous designs. The embodiments of the unmanned vehicle 2 in FIG. 2a and FIG. 2b preferably have a switch signal generator 65. The latter is preferably embodied as permanent magnet or electromagnet, which activates a reed switch in response to approaching the fire protection component. In the exemplary embodiment in FIG. 5, the switch signal generator 65, which is preferably embodied as permanent magnet here, triggers a switch signal in the fire detector, which is preferably sent to a fire detector and/or extinguishing control center (not illustrated) and represents a test signal.

Figure 2C:
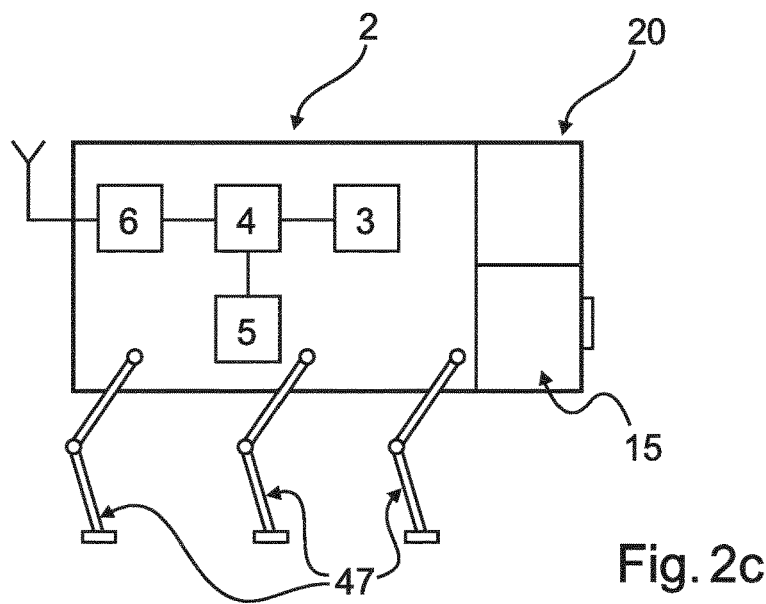
FIG. 2*c* shows the unmanned vehicle in an embodiment as robot crawler in a schematic illustration.
Figure 6:
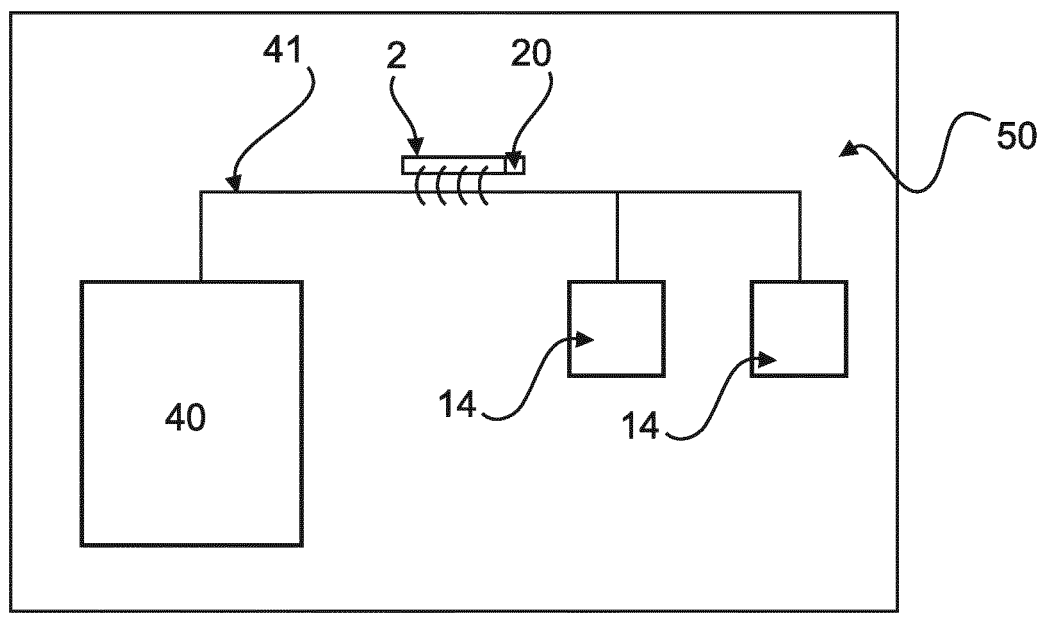
FIG. 6 shows an embodiment of the vehicle as robot crawler in response to navigating to an extinguishing structure component in a schematic illustration.

The embodiment of the unmanned vehicle 2 as robot crawler is illustrated schematically in FIG. 2c and also in FIG. 6. In FIG. 2c, the exemplary robot crawler has six multi-link articulated arms, only three of which are illustrated, in FIG. 6, it has eight articulated arms, only four of which are illustrated. In the exemplary schematic illustration in FIG. 6, the robot crawler navigates along a pipeline 41. The latter connects the extinguishing agent supply device 40 to the fire protection component 1, which is embodied as extinguishing structure component 14, here embodied for example as sprinkler. The robot crawler has the testing device 20 for performing the test of the extinguishing structure component 14, for example the sprinklers.

In all embodiments, the unmanned vehicle 2 has a computer unit 4, a memory 5, and a first signal transmitting and/or receiving unit 6. The first signal transmitting and/or receiving unit 6 is embodied for receiving a navigation control signal, in particular from a remote control device 30, which is illustrated in FIG. 3b. For example, the service personnel can remotely control the unmanned vehicle by means of the remote control device 30. This is advantageous for example when unforeseen environmental conditions in the nearby surroundings of some fire protection components occur, e.g. after reconstruction measures in the protection area 50 or in the case of obstacles, which are present temporarily. The intervention by the service or the maintenance personnel in response to navigating the unmanned vehicle 2 to the fire protection component 1 is necessary, in order to nonetheless successfully perform the test on these fire protection components by means of the remote control 30. The embodiment alternative, in which the navigation to the fire protection component 1 takes place only by means of the remote control device 30, represents a cost-optimized alternative.

The navigation control unit 3 is preferably embodied and/or configured for navigating the unmanned vehicle 2 to the fire protection component 1 or one of the fire protection components, in particular to the assigned test position (xi, yi, zi) on the basis of the navigation control signal.

In a preferred version of the embodiment alternative, the navigation control unit 3 is embodied and configured for independently navigating the unmanned vehicle 2. The unmanned vehicle can thus quickly reach the fire protection component, on which the test is to be performed, without intervention by the service personnel. This is particularly advantageous in response to testing a larger number of fire protection components, for example 50, 100 or more.

The combination of the embodiment for independently navigating and navigating with the remote control device 30 is an embodiment alternative, which can be used in a particularly flexible manner and which combines the above-mentioned advantages. This embodiment alternative is characterized in that the navigation control unit 3 is embodied and/or configured for independently navigating the unmanned vehicle 2 and for navigating the vehicle on the basis of the navigation control signal.

Identification data of the fire protection component to be tested is preferably necessary for testing the fire protection components. The identification data 10 preferably represents a type of the fire protection component 1, an article number of the fire protection component 1, production data of the fire protection component 1, a production date of the fire protection component 1, a serial number of the fire protection component 1, a software version of the fire protection component 1, a date of the last test of the fire protection component 1, test parameter data of the fire protection component 1, position data of the fire protection component 1, and/or an assigned test position (xi, yi, zi) of the fire protection component 1, and/or preferably have this. So as not to have to store all of the identification data of the fire protection components 1 to be tested in the unmanned vehicle, this identification data 10 is received by the fire protection component 1, preferably if required, preferably transmitted to the unmanned vehicle 2 in an advantageous embodiment of the invention.

Figure 3A:
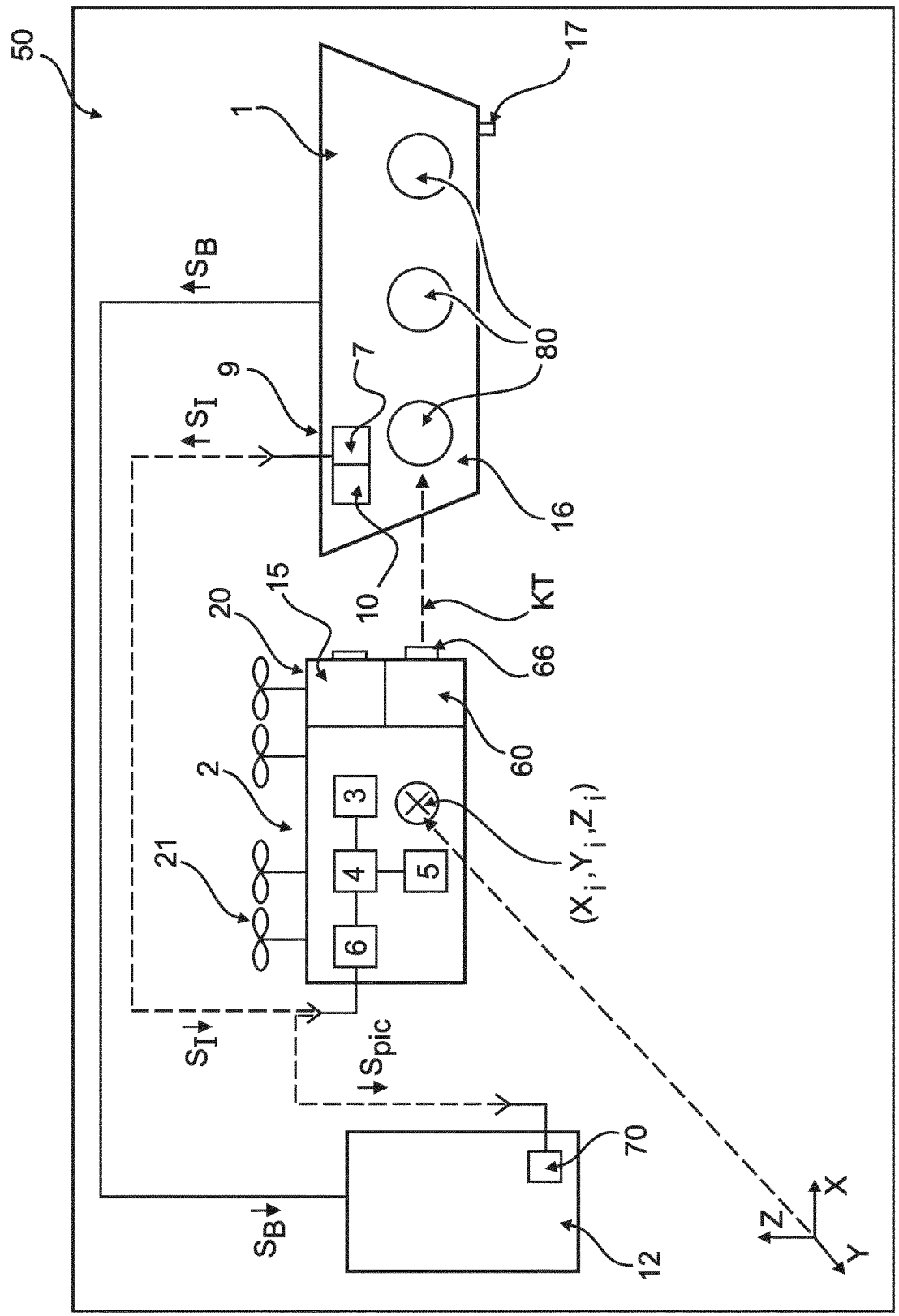
FIG. 3*a* shows an embodiment of the unmanned vehicle in an assigned test position in a schematic illustration.
Figure 3B:
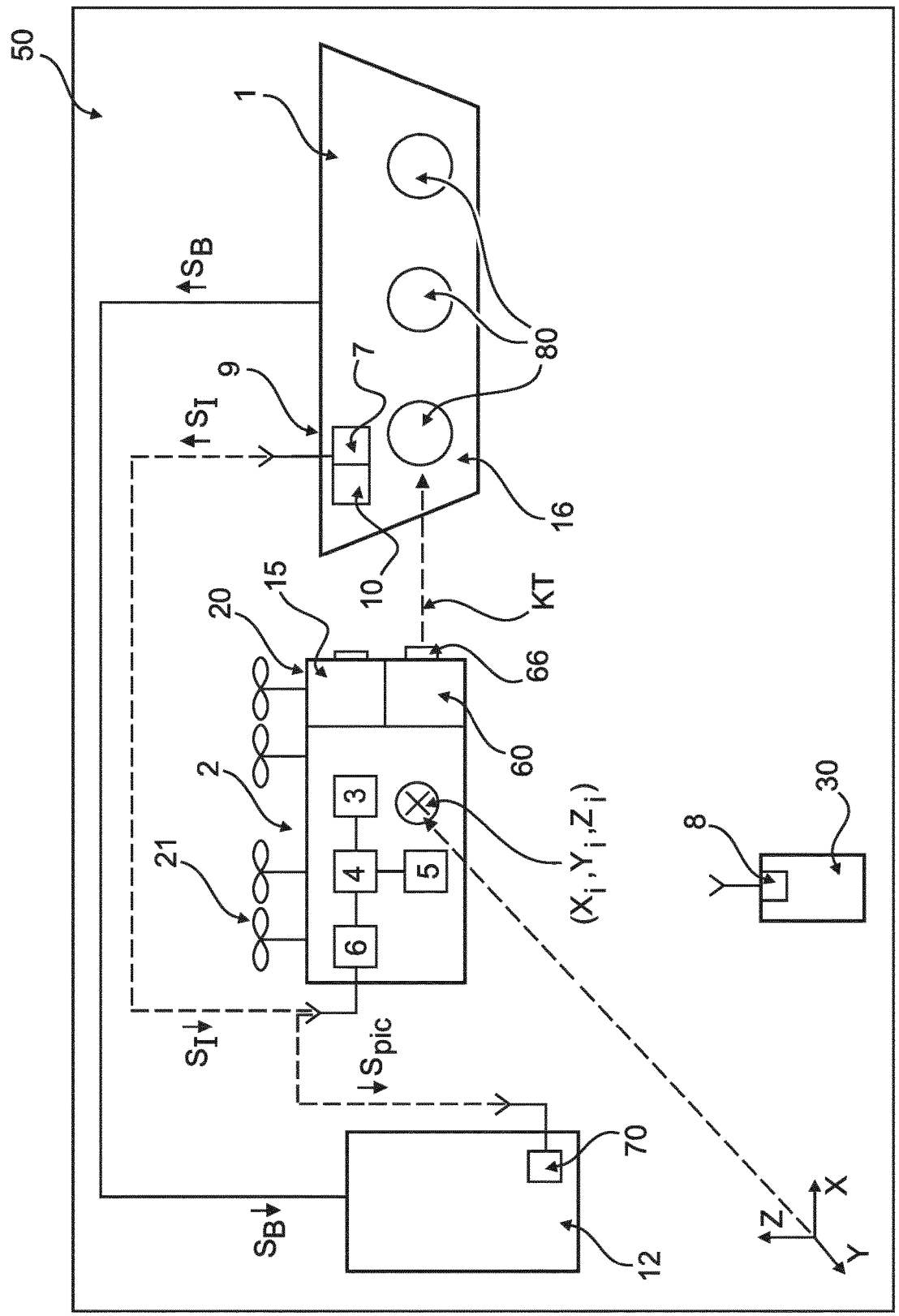
FIG. 3*b* shows a further embodiment of the unmanned vehicle in an assigned test position in a schematic illustration.

For this purpose, the first signal transmitting and/or receiving unit 6 or a further signal transmitting and/or receiving unit 6a (not illustrated) of the unmanned vehicle 2 is preferably embodied for the, in particular wireless, receipt of an identification signal S1, which is illustrated schematically in FIG. 3a and FIG. 3b.

The identification signal S1 represents the identification data 10 for the characterization and/or identification of the or the at least one fire protection component 1. The unmanned vehicle 2 is embodied and/or configured for performing the test of the respective fire protection component 1 on the basis of the corresponding identification data 10. The identification data 10 is preferably retrieved or received by the unmanned vehicle 2 when approaching the fire protection component 1 and is preferably stored in the memory 5 of the unmanned vehicle 2.

As illustrated schematically in FIGS. 3a and 3b, the identification data 10 is preferably stored in a radio identification means 9, which is arranged on or in the fire protection component 1. In the illustrated example in FIG. 3a or 3b, only one of a plurality of fire protection components 1 of the fire protection structure 11 is illustrated, namely the embodiment of this fire protection component 1 as fire detector 16.

The first signal transmitting and/or receiving unit 6 or the further signal transmitting and/or receiving unit 6a (not illustrated) of the unmanned vehicle 2 is preferably embodied and/or configured for receiving the identification signal S1 from the radio identification means 9, which is embodied for example as NFC tag or as RFID tag.

After evaluation of the received identification data 10, the unmanned vehicle 2 evaluates said identification data, in particular by means of the computer unit 4, in particular the type of the fire protection component 1 and/or the test parameter data and performs the type of the test stored with regard to this data on this fire protection component 1. The unmanned vehicle 2 is embodied and/or configured accordingly for this purpose.

The unmanned vehicle 2 is in particular embodied and/or configured for generating an activation signal SA, in particular when the unmanned vehicle 2 reaches the respective fire protection component 1 and/or the corresponding test position (xi, yi, zi) and activates the test of the respective fire protection component, when and/or as soon as the activation signal SA is generated. After an unambiguous identification of the fire protection component 1, the test provided for this fire protection component is thus performed. This is advantageous for a quick and cost-efficient performance of the test of a plurality of fire protection components. In response to the on-site inspection of the fire protection components by the service personnel, it is often not possible to determine the type of the fire protection component, which is installed at a large height, without aids, and to determine, for example, whether it is a smoke detector, gas detector, heat detector or multi-sensor detector, which do not differ outwardly. In response to the on-site inspection, which is common in the prior art, the selection of the necessary testing or checking means is thus delayed, which leads to long cost-intensive tests.

To perform the test, the unmanned vehicle 2, in particular the testing device 20, has an image capturing device 15 and/or a checking device 60, as it is illustrated schematically in FIGS. 2a to 2c as well as FIGS. 3a and 3b. The checking device 60 generates a test parameter KT, in particular for the test triggering of fire detectors. As illustrated in FIGS. 3a and 3b, the checking device 60 has a test parameter exit 66 for an exit of the test parameter KT.

The image capturing device 15 is preferably embodied and/or configured for capturing an image and for generating corresponding image data Spic of a fire protection component 1, which has been reached before. In a particularly preferred embodiment alternative, the testing device 20 is embodied and/or configured for independently performing the functionality of the fire protection component 1 on the basis of the image data Spic. The image data Spic is stored for this purpose in the image capturing device or in the memory 5 of the unmanned vehicle and is compared to stored comparison data. An image of the glass ampoule of a sprinkler can thus be evaluated as to whether damages to the holder of the glass ampoule or of the glass ampoule itself is present. The image of a fire detector can for example show an inadmissible color coating caused by paintwork, in particular above inlet openings for fire parameters, which suggests an inoperability.

In a further embodiment alternative, the unmanned vehicle 2 is wirelessly connected to a control center 12 for transmitting the image data Spic, in particular by means of the first signal transmitting and/or receiving unit 6, which is illustrated schematically in FIG. 3a and FIG. 3b. In addition or in the alternative, the transmission of the image data Spic can take place to the remote control device 30. The image data Spic is preferably stored there. This makes it possible to perform an image evaluation or image comparison, respectively, with the help of the comparison data stored in the control center and/or the remote control device. In the alternative, the image evaluation takes place visually by the service or maintenance personnel. The captured image or the captured images of the fire protection component as well as preferably also of the comparison data can be displayed for this purpose by means of a display device of the control center 12 or of the remote control device 30.

Figure 7:
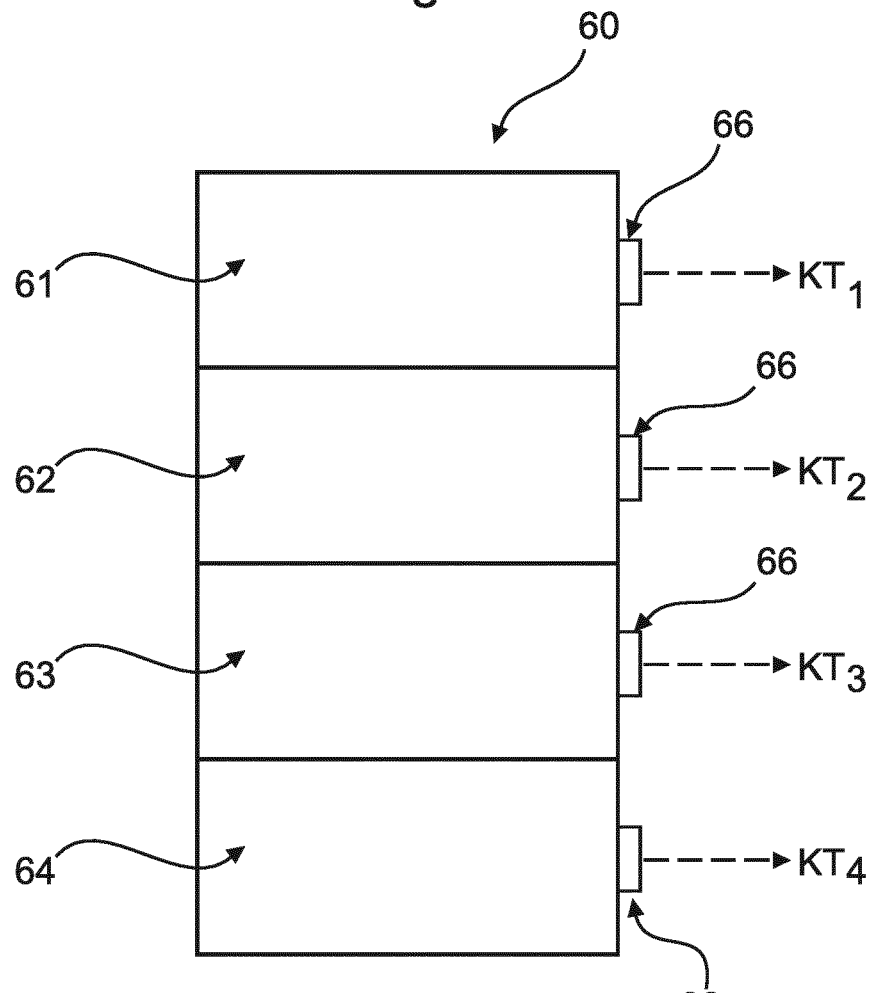
FIG. 7 shows an embodiment of the checking device of the unmanned vehicle in a schematic illustration.

An exemplary checking device 60 is illustrated schematically in FIG. 7. This illustrated checking device comprises an aerosol generator 61, a gas generator 62, a source of radiation 63, a heat generator 64.

As test parameters KT, for example an aerosol stream KT1 can be generated by the aerosol generator, and/or a test gas KT2 can be generated by the gas generator, and/or an electromagnetic radiation KT3 can be generated by the source of radiation, and/or a heat radiation KT4 can be generated by the heat generator. The checking device has four test parameter exits 66 in this example.

The checking device 60 is embodied and/or configured for generating the test parameter KT, preferably after receipt of the activation signal SA.

For performing the test, all of the embodiment alternatives of the checking device 60 are configured and/or embodied for generating the test parameter KT, which can preferably be output through the test parameter exit 66. The test parameter exit 66 is for example an opening, preferably a circular opening, through which the respective test parameter KT can be output. The generation and/or outputting of the test parameter preferably takes place after receiving the activation signal SA.

In a further advantageous embodiment of the checking device 60, a plurality of test parameters can be output through only one test parameter exit 66, as is illustrated in the example of the schematic illustration in FIG. 5, in which the unmanned vehicle 2 is illustrated as robot comprising wheels 46 in the exemplary embodiment, and the checking device 60 has an aerosol generator 61 and a gas generator 62.

FIG. 7 shows an embodiment alternative of a checking device 60 of an unmanned vehicle 2, which is characterized in that the checking device 60 is embodied and/or configured for in particular synchronously or sequentially generating four different test parameters KT. In the illustrated example, these four test parameters KT1, KT2, KT3 and KT4 exit from a corresponding test parameter exit 66 each.

Figure 9:
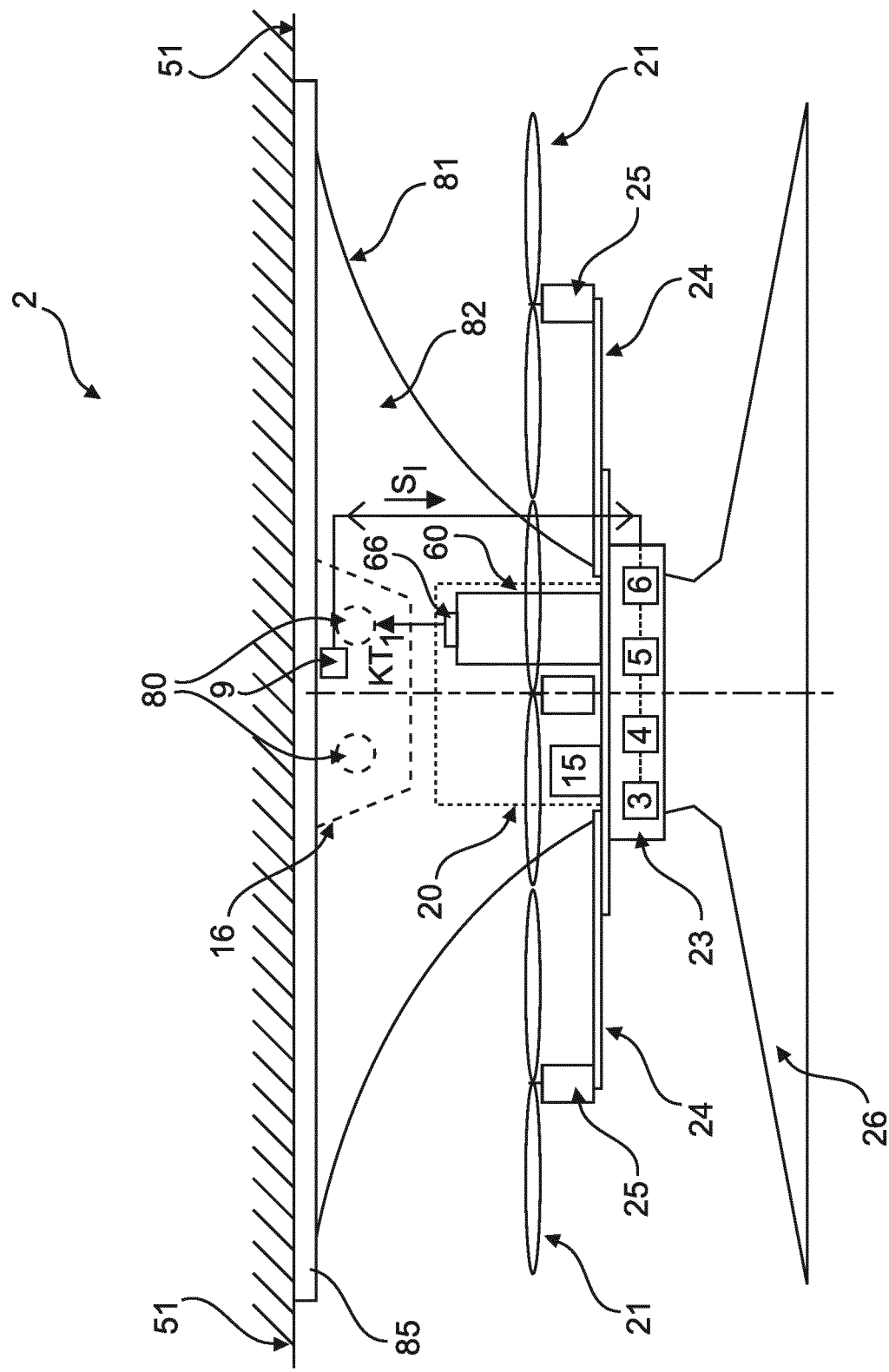
FIG. 9 shows an embodiment of the unmanned vehicle as drone, as quadrocopter, comprising a shielding device, in a schematic illustration.
Figure 10:
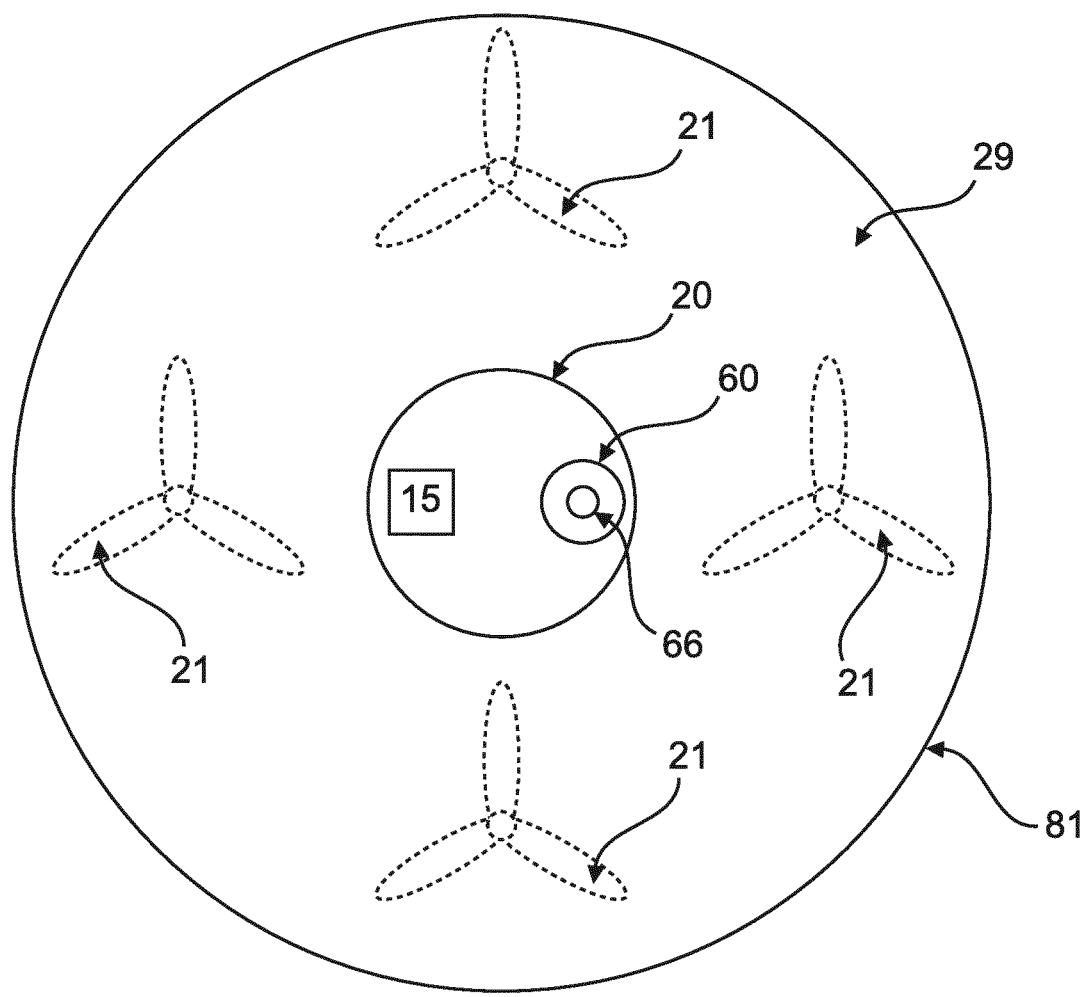
FIG. 10 shows the top view onto the embodiment according to FIG. 9 in a schematic illustration.

In the embodiment alternatives illustrated in FIGS. 3a and 3b, the checking device 60 of the unmanned vehicle 2 is embodied and/or configured for controlling the generation of the at least one test parameter KT on the basis of the identification signal S1, in particular a temporal sequence of the generation and/or outputting of the test parameters KT, provided that a plurality of test parameters KT are provided, as illustrated in FIG. 7. The identification signal S1, which, when the unmanned vehicle 2 approaches the fire protection component 1, here embodied as fire detector 16 in the protection area 50, is sent by a radio identification means 9, which is embodied for example as RFID tag, and is received by the first signal transmitting and/or receiving unit 6 of the unmanned vehicle 2. The fire detector 16 illustrated in FIG. 3a is for example a smoke detector, so that the identification signal S1 has test parameter data, which makes it possible to control the test parameter generation on the basis of this and to output the necessary test parameter aerosol stream or test aerosol for the test triggering of the fire detector 16 via the test parameter exit 66. Prior to the outputting of the test parameter, the unmanned vehicle 2 assumed the assigned test position (xi, yi, zi), which provides for a reliable test of the fire protection component 1, here for example the test triggering of the fire detector 16, on the basis of the received identification data S1.

Embodiments of the unmanned vehicle 2 are illustrated in FIG. 4 and FIG. 5, in which the vehicle 2, in particular the checking device 60, has a rotatable, pivotable and/or length-adjustable aligning device 68. The test parameter exit 66 is arranged on this aligning device 68 and here for example on an end section of the aligning device 68 facing away from the vehicle 2. The unmanned vehicle 2, preferably the checking device 60, is embodied and/or configured for controlling the aligning device 68, in order to align the test parameter exit 66, in particular to or relative to the respective fire protection component 1.

The aligning device 68 can have a joint unit 67, which can be controlled by an actuator and/or a device 69, which can be length-adjusted in the manner of a telescope, so that a rotation, a pivoting and/or a height-adjusting of the test parameter exit 66 is made possible by controlling the actuator (see FIG. 4 and FIG. 5).

It is attained by means of the alignment of the test parameter exit 66 by means of the aligning device 68 that the test parameter KT reaches into the fire parameter inlet opening 80 of the fire detector after exiting from the test parameter exit 66, preferably via the shortest route and within the shortest possible time, in order to attain a test triggering of the fire detector (see FIG. 4 and FIG. 5).

An unmanned vehicle 2 in the embodiment as drone, for example embodied here as quadrocopter, is illustrated schematically in FIGS. 9 and 10. The unmanned vehicle 2 is illustrated in the position, in which the test of a fire protection component 1 is performed. In the illustrated example, the fire protection component 1 is embodied as fire detector 16, which is arranged on the ceiling 51 of a protection area 50 (not illustrated). The test triggering of the fire detector is preferably provided as test. In this exemplary embodiment, the unmanned vehicle 2 has a shielding device 81. In this example, the shielding device 81 is embodied as funnel attachment. The shielding device 81 is embodied for embodying a defined test parameter propagation volume 82 around the fire protection component 1, embodied as fire detector 16 here. As illustrated, the unmanned vehicle 2 preferably has a computer unit 4, a memory 5, and a first signal transmitting and/or receiving unit 6, which are preferably arranged in or on the base body 23 of the drone. The first signal transmitting and/or receiving unit 6 or a further signal transmitting and/or receiving unit 6*a* (not illustrated) of the unmanned vehicle 2 is or are preferably embodied and/or configured, respectively, for receiving the identification signal S1 from the radio identification means 9 of the fire protection component 1, here as fire detector 16, which is embodied for example as NFC tag or as RFID tag. The unmanned vehicle 2 has a testing device 20, comprising a checking device 60, which outputs a test parameter KT, here for example KT1, as aerosol stream or test aerosol, through the test parameter exit 66. By navigating the unmanned vehicle 2, the funnel attachment 81 is positioned in such a way that, completely encompassing the fire detector 16, the funnel opening is pushed against the ceiling 51. At least one fire parameter inlet opening 80, here preferably two, are enclosed by the defined test parameter propagation volume 82. In this exemplary embodiment, the testing device furthermore has an image capturing device 15.

The shielding device 81, here the funnel attachment, channels the test parameter KT, here for example the aerosol stream KT1, in particular test aerosol from the test parameter exit 66 to the fire parameter inlet opening 80. The output quantity of the test parameter and the defined test parameter propagation volume 82 provide for the test triggering of the fire detector 16.

The rotary wings 21, which are driven via drive motors 25, are furthermore illustrated as drone in FIG. 9 in the schematically illustrated exemplary embodiment of the unmanned vehicle 2. The drive motors 25 are fastened to arms 24, which are arranged on the base body 23. For the secure landing, a landing gear 26 is preferably arranged on the base body 23.

The shielding device 81, preferably embodied as funnel attachment in the example of the schematic illustrations in FIG. 9 and FIG. 10, preferably has a double function, namely the formation of the defined test parameter propagation value and the deflection of the air flow generated by the rotary wings and the flight movement of the drone.

Due to the diameter of the funnel wall, which becomes larger in perpendicular flight direction, the particularly preferred embodiment of the shielding device 81 as funnel attachment, deflects the air flow particularly effectively, so that the suction effect to the ceiling 51, which is created by the air flow generated by the rotary wings 21, is reduced or prevented. In the illustrated example of FIG. 10, the shielding device has a sealing edge 85, for example of silicon. It is thus attained that, when pushing the shielding device 81 against the ceiling 51, the test parameter KT, for example KT1, can propagate almost only, or completely, within the formed defined test parameter propagation volume 81.

As illustrated schematically in FIG. 10, the shielding device 81, preferably the illustrated funnel attachment of the unmanned vehicle 2, embodied as drone comprising rotary wings 21, has a projection surface 29 perpendicular to the axes of rotation of the rotary wings 21, which, viewed in the direction of the axes of rotation of the rotary wings, 21, at least partially overlaps the surface passed over by the rotary wings 21, here in this example preferably completely. This provides for the described deflection of the air flow.

A further exemplary embodiment of the unmanned vehicle 2 comprising a shielding device 81 is illustrated in FIG. 11. The shielding device 81 has a first shielding element 83 and a second shielding element 84. The first shielding element 83 is embodied for embodying the defined test parameter propagation volume 82. The second shielding element 83 has the projection surface 29 perpendicular to the axes of rotation of the rotary wings 21, which, viewed in the direction of the axes of rotation of the rotary wings 21, at least partially overlaps the surface passed over by the rotary wings 21, in this example completely (not illustrated, but analogously as in the embodiment alternative in FIG. 10). In the illustrated example in FIG. 11, the first shielding element 83 is embodied as cap and the second shielding element 84 is embodied as disk. The cap preferably has a sealing edge 85, preferably of silicon. Analogously to the exemplary embodiment in FIG. 9, it is thus attained that when pushing the shielding device 81 against a fire detector, the test parameter KT, for example KT1, can propagate virtually only or complexly within the formed defined test parameter propagation volume 81.

Figure 4:
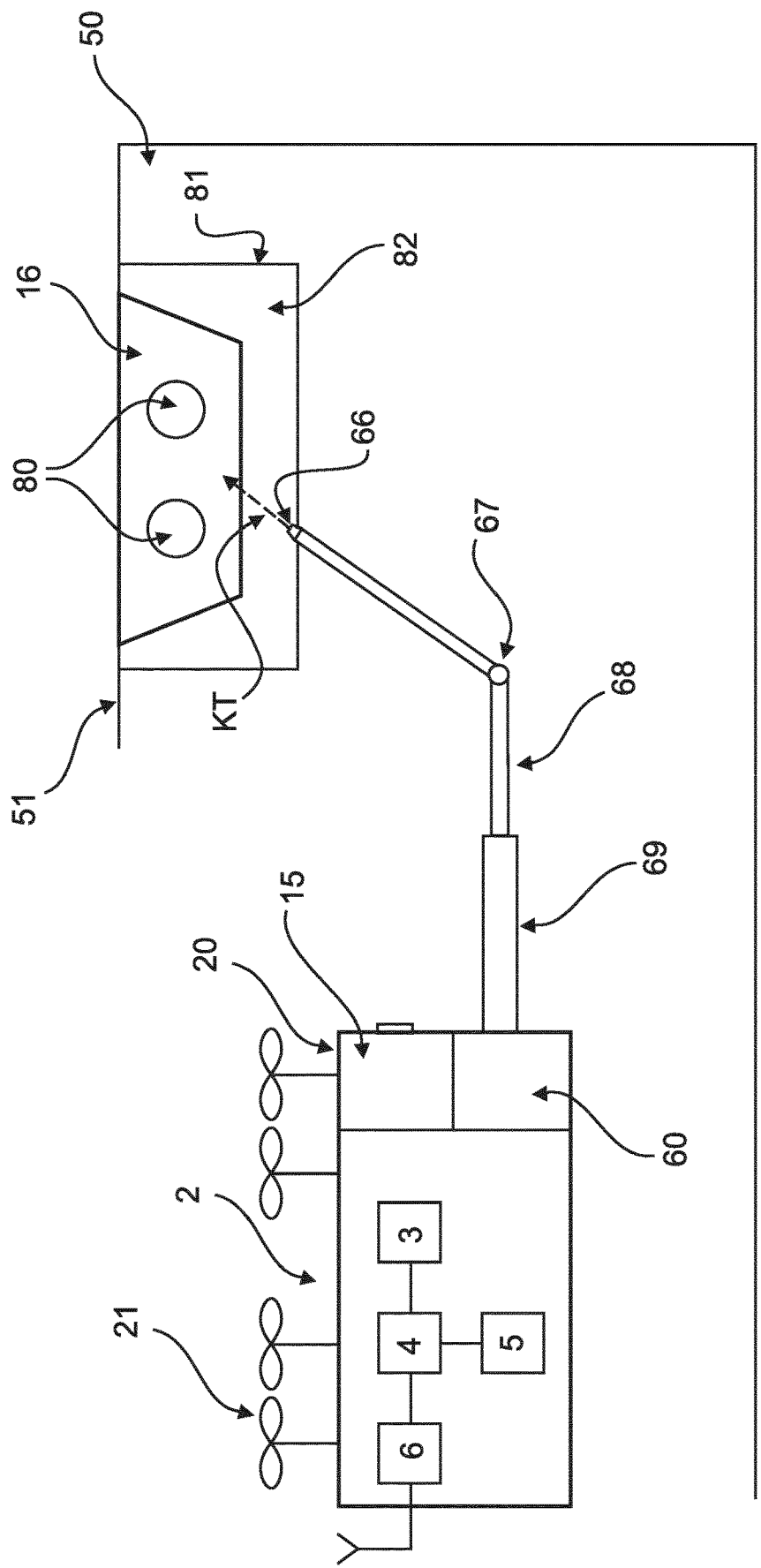
FIG. 4 shows an embodiment of the checking device comprising aligning device in a schematic illustration.

The embodiment alternatives of the unmanned vehicle 2 illustrated schematically in FIG. 4 and FIG. 5 are characterized in that the checking device 60 has a shielding device 81, which can surround the test parameter exit 66 and the fire parameter inlet opening 80 of the fire detector, here preferably surrounds it, and the defined test parameter propagation volume 82 can be embodied. The shielding device 81 preferably channels the test parameter KT from the test parameter exit 66 to the fire parameter inlet opening 80, in particular through the formed test parameter propagation volume 82. It is attained thereby that a sufficient quantity of the test parameter reaches the sensor or the sensors of the fire detector through the fire parameter inlet opening 80, in order to ensure a successful test triggering. The shielding device is embodied as cap in the embodiment alternatives illustrated in FIG. 4 and FIG. 5.

In the schematic illustration of FIG. 4, the fire detector 16 is illustrated so as to be mounted to the ceiling 51. The shielding device 81, here preferably the cap, is positioned in such a way by means of the aligning device 68 that it is pressed against the ceiling in a preferably almost completely hermetically sealed manner and the defined test parameter propagation volume 82 is formed between the ceiling 51, the inner wall of the shielding device 81, and the fire detector 16. The fire detector 16 is hereby completely encompassed by the shielding device 81.

In the schematic illustration of FIG. 5, the fire detector 16 is also illustrated as being mounted to the ceiling, but a mounting of the fire detector to a substructure is conceivable as well here. By means of the aligning device 68, the shielding device 81, here preferably the cap, is positioned in such a way in this embodiment alternative that it is pressed against the housing of the fire detector 16 so as to be almost hermetically sealed, and the defined test parameter propagation volume 82 is formed between the inner wall of the shielding device 81 and the fire detector 16. The fire detector 16 is thereby partially encompassed by the shielding device 81, preferably in such a way that at least one or all fire parameter inlet openings 80 are located within the defined test parameter propagation volume 82.

The use of the shielding device 81 and the formation of the defined test parameter propagation volume 82 is particularly advantageous when using the test parameters aerosol stream or test aerosol KT1 and test gas KT2. Without shielding device 81 and the formation of the defined test parameter propagation volume 82, the aerosol stream or the test aerosol or the test gas would propagate in the surrounding area of the fire detector in an uncontrolled manner, in particular when the unmanned vehicle is embodied as drone, the rotary wing of which swirls the ambient air of the fire detector.

Figure 8A:
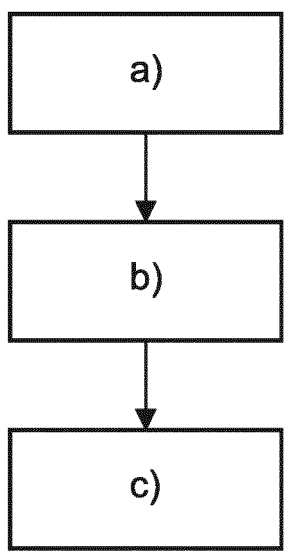
FIG. 8*a* shows a schedule of method steps of a preferred embodiment of the method in a schematic illustration.

According to the first aspect of the invention, a method for testing a fire protection component 1 of a fire protection structure 11 is provided, wherein the steps of the method are illustrated schematically in FIG. 8*a*.

According to a step a) of the method, a providing of an unmanned vehicle 2 is provided.

According to a step b), a navigating of the unmanned vehicle 2 by means of a navigation control unit 3 of the unmanned vehicle 2 to the fire protection component 1, at which a test is to be performed, is provided.

According to a method step c), the performing of the test on the fire protection component 1 by means of a testing device 20 of the unmanned vehicle 2 is furthermore provided.

Insofar as it is expedient, reference is made analogously for steps a) to c) to the preceding explanations, preferred features, effects and/or advantages and embodiments, as they have been discussed before for the unmanned vehicle 2.

According to an advantageous embodiment of the method, it is provided that the unmanned vehicle 2 is navigated to the fire protection component 1 in such a way in step b) that the unmanned vehicle is arranged in a test position (xi, yi, zi), which is assigned to the fire protection component 1. Reference is also made analogously here to the preceding explanations, preferred features, effects and/or advantages, as they have been discussed before for the unmanned vehicle 2.

According to a further advantageous embodiment of the method, it is provided that the fire protection structure 11 has a plurality of fire protection components 1, for each of which a test is provided, wherein steps b) and c) are performed one after the other for each of the fire protection components as the respective fire protection component 1, for which a test is to be performed.

Figure 8B:
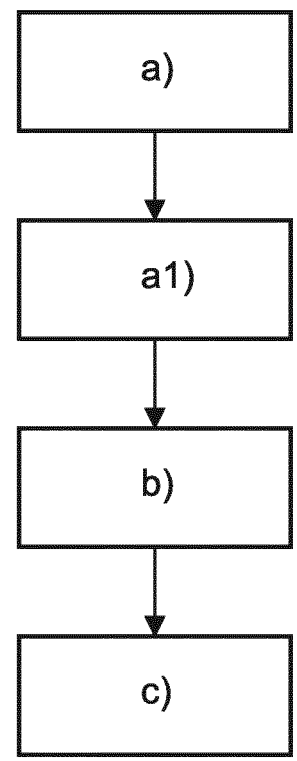
FIG. 8*b* shows a schedule of method steps in a further embodiment of the method in a schematic illustration.

A further advantageous embodiment of the method is shown in FIG. 8*b*. The method is thereby characterized by the further step a1). According to step a1), a receiving of a navigation control signal, for example from a remote control device 30, takes place by means of a first signal transmitting and/or receiving unit 6 of the unmanned vehicle 2, wherein the navigating of the vehicle 2 in step b) takes place on the basis of the navigation control signal, and step a1) is performed between step a) and b). For step a1), reference is made analogously to the preceding explanations, preferred features, effects and/or advantages, as they have been discussed before for the unmanned vehicle 2.

According to a further advantageous embodiment of the method, it is provided that the navigating takes place independently in step b) by means of the navigation control unit 3. Reference is also made analogously here to the preceding explanations, preferred features, effects and/or advantages, as they have been discussed before for the unmanned vehicle 2.

According to a further advantageous embodiment of the method, it is provided that the navigating in step b) takes place by means of a combination of the navigating of the unmanned vehicle 2 on the basis of the navigation control signal and the independent navigating by means of the navigation control unit 3. Reference is also made analogously here, in turn, to the preceding explanations, preferred features, effects and/or advantages, as they have been discussed before for the unmanned vehicle 2.

According to a further advantageous embodiment of the method, it is provided that the testing device 20 has a checking device 60 for generating a test parameter KT, wherein the checking device has a test parameter exit 66 for an exit of the test parameter KT, and the checking device 60 generates a test parameter KT in step c), which exits through the test parameter exit 66, wherein the test parameter KT generates a fire detector signal SB and/or a light signal of an optical display device 17 on the fire detector 16 in the fire protection component 1, which is embodied as fire detector. The fire detector signal SB is hereby preferably transmitted to the unmanned vehicle 2 and/or to a control center 12, preferably a fire detector and/or extinguishing control center, and this fire detector signal SB is preferably captured as test acknowledgement signal ST. Reference is made analogously here again, in turn, to the preceding explanations, preferred features, effects and/or advantages, as they have been discussed before for the unmanned vehicle 2 and as will be discussed below for the fire protection system.

Figure 8C:
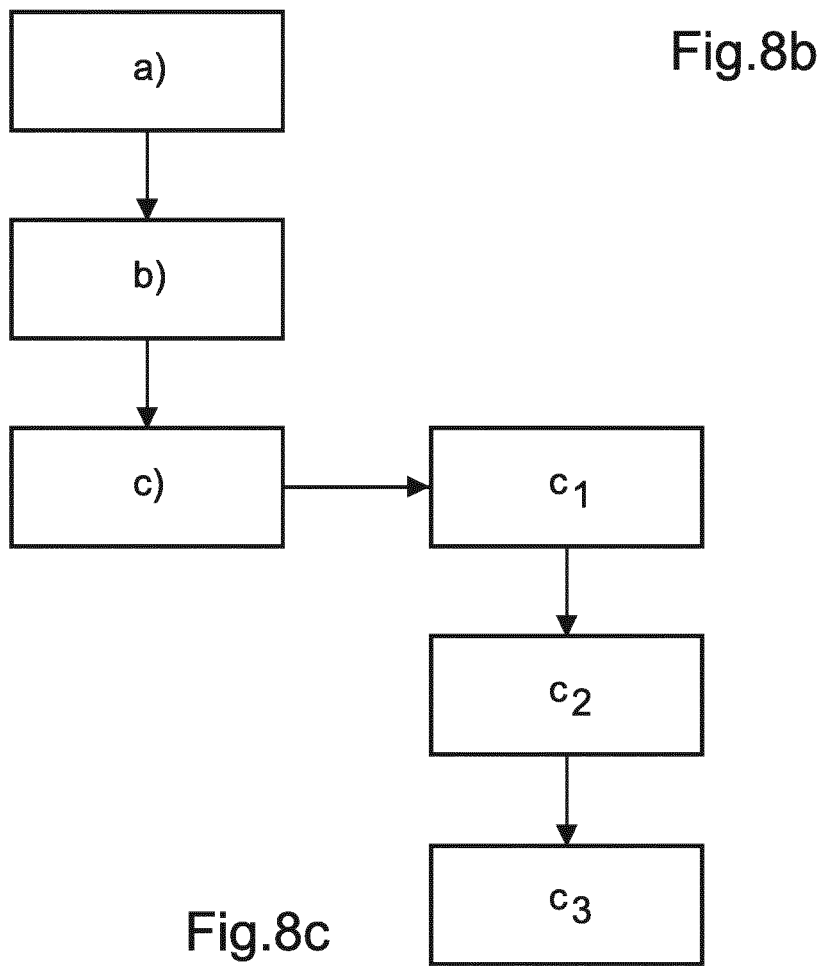
FIG. 8*c* shows a schedule of method steps of a third embodiment of the method in a schematic illustration.

A further advantageous embodiment of the method is shown in FIG. 8c. The method is thereby characterized in that the testing device 20 has an image capturing device 15, which is embodied for capturing an image and for generating image data Spic, which represent the captured image, wherein step c) has the partial steps c1), c2) and c3), namely:

c1) capturing an image of the fire protection component 1;

c2) generating image data $S_{pic}$, which represents the captured image; and c3) determining a functionality of the fire protection component 1.

Reference is analogously made here again, in turn, to preferred features, effects and/or advantages, as they have been discussed above for the unmanned vehicle 2, and as will be discussed below for the fire protection system.

According to the third aspect of the invention, a fire protection system is provided, wherein this fire protection system is illustrated schematically in FIG. 1. It comprises a fire protection structure 11 comprising at least one fire protection component 1, in the illustrated example comprising four fire protection components, two embodied as fire detectors 16 and two as extinguishing structure component 14. The unmanned vehicle 2 is embodied according to the second aspect of the invention, preferably comprising the differently described embodiments. The fire protection system according to the invention furthermore has a further device, in particular a control center 12, for example a fire detector and/or extinguishing control center or a remote control device 30 (see FIG. 3b).

The unmanned vehicle 2 is embodied and/or configured for performing a method for testing the at least one fire protection component 1 of the fire protection structure 11 according to the first aspect of the invention and preferably according to the described embodiments thereof.

A part of the fire protection system is illustrated in more detail in FIG. 3a. The fire protection component 1 is embodied as fire detector 16 and the unmanned vehicle 2 has a testing device 20 comprising a checking device 60 and/or preferably comprising an image capturing device 15. The checking device 60 is embodied and/or configured for generating a test parameter KT. The fire detector 16 is further embodied and/or configured for generating a fire detector signal SB and/or a light signal of an optical display device 17 of the fire detector 16 after a detection of the test parameter TK, preferably after test triggering, wherein the fire detector signal SB is preferably transmitted to the control center 12, preferably to a fire detector and/or extinguishing control center. The control center 12 is embodied and/or configured for capturing this fire detector signal SB as test acknowledgment signal ST. The control center 12 is further embodied and/or configured for being switched into a test mode prior to testing the at least one fire protection component 1. The image capturing device 15 preferably captures the light signal of the optical display device 17 on the fire detector 16. This is stored as successful performance of the test, in particular of the test triggering in the unmanned vehicle.

| | Reference List |
|---|---|
| 1 | fire protection component |
| 2 | unmanned vehicle, e.g. aircrafts, drones, robot crawler |
| 3 | navigation control unit |
| 4 | computer unit |
| 5 | Memory |
| 6 | first signal transmitting and/or receiving unit |
| 6a | further signal transmitting and/or receiving unit |
| 7 | second signal transmitting and/or receiving unit |
| 8 | third signal transmitting and/or receiving unit |
| 9 | radio identification means, e.g. NFC or RFID tag |
| 10 | identification data |
| 11 | fire protection structure |
| 12 | control center, e.g. fire detector and/or extinguishing control center |
| 14 | extinguishing structure component |
| 15 | image capturing device |
| 16 | fire detector |
| 17 | optical display device |
| 20 | testing device |
| 21 | rotary wing |
| 23 | base body |
| 24 | arm to the drive motor |
| 25 | drive motor |
| 26 | landing gear |
| 29 | projection surface |
| 30 | remote control device |
| 40 | extinguishing means supply device |
| 41 | pipelines |
| 46 | wheel |
| 47 | articulated arms |
| 50 | protection area |
| 51 | Ceiling |
| 60 | checking device |
| 61 | aerosol generator |
| 62 | gas generator |
| 63 | source of radiation |
| 64 | heat generator |
| 65 | switch signal generator |
| 66 | test parameter exit |
| 67 | joint unit |
| 68 | aligning device |
| 69 | length-adjustable device |
| 70 | control center transmitting and/or receiving device |
| 80 | fire parameter inlet opening |
| 81 | shielding device |
| 82 | defined test parameter propagation volume |
| 83 | first shielding element |
| 84 | second shielding element |
| 85 | sealing edge |
| $S_A$ | activation signal |
| $S_B$ | fire detector signal |
| $S_T$ | test acknowledgment signal |
| $S_i$ | identification signal |
| $S_{pic}$ | image data |
| KT | test parameter |
| $KT_1$ | test parameter aerosol stream, e.g. test aerosol |
| $KT_2$ | test parameter test gas, e.g. CO or $CO_2$ |
| $KT_3$ | test parameter electromagnetic radiation |
| $KT_4$ | test parameter heat radiation |
| $(x_i, y_i, z_i)$ | assigned test position |

The invention claimed is:

1. A method for testing at least one fire protection component of a fire protection structure, wherein the method has the following steps:

a) providing an unmanned vehicle;
b) navigating the unmanned vehicle by a navigation control unit of the unmanned vehicle to the at least one fire protection component, at which a test is to be performed; and
c) performing the test on the at least one fire protection component by a testing device of the unmanned vehicle, wherein the at least one fire protection component comprises:
  (I) one or more fire protection components, each of the one or more fire protection components having a plurality of assigned test positions; and/or
  (II) a plurality of different types of fire protection components, each of the plurality of different types of fire protection components having at least one assigned test position.

2. The method according to claim 1, wherein the unmanned vehicle is navigated to the at least one fire protection component in such a way in step b) that the unmanned vehicle is arranged in the assigned test position.

3. The method according to claim 1, wherein the fire protection structure has a plurality of fire protection components, for each of which a test is provided, wherein steps b) and c) are performed one after the other for each of the fire protection components as the respective fire protection component, for which a test is to be performed.

4. The method according to claim 1, including step a1), which is to be performed between step a) and step b),
receiving a navigation control signal from a remote control device by a first signal transmitting and/or receiving unit of the unmanned vehicle, wherein the navigation of the vehicle in step b) takes place on the basis of this navigation control signal.

5. The method according to claim 1, wherein the navigation in step b) takes place independently by the navigation control unit.

6. A method for testing at least one fire protection component of a fire protection structure, the method comprising the steps of:
a) providing an unmanned vehicle;
b) navigating the unmanned vehicle by a navigation control unit of the unmanned vehicle to the at least one fire protection component, at which a test is to be performed; and
c) performing the test on the at least one fire protection component by a testing device of the unmanned vehicle;
the method further including step a1), which is to be performed between step a) and step b), wherein step a1) comprises:
receiving a navigation control signal from a remote control device by a first signal transmitting and/or receiving unit; and
wherein the navigation in step b) takes place by a combination of the navigating of the unmanned vehicle on the basis of the navigation control signal and the independent navigation by the navigation control unit.

7. A method for testing at least one fire protection component of a fire protection structure, the method comprising the steps of:
a) providing an unmanned vehicle;
b) navigating the unmanned vehicle by a navigation control unit of the unmanned vehicle to the at least one fire protection component, at which a test is to be performed; and
c) performing the test on the at least one fire protection component by a testing device of the unmanned vehicle;
wherein the testing device has a checking device for generating a test parameter, wherein the checking device has a test parameter exit for an exit of the test parameter;
wherein the checking device generates the test parameter in step c), which exits through the test parameter exit;
wherein the test parameter generates a fire detector signal and/or a light signal of an optical display device on a fire detector in the fire protection component and
wherein the fire detector signal is sent to the unmanned vehicle and/or to a control center, having a fire detector and/or extinguishing control center, and/or to a remote control device and this fire detector signal is captured as a test acknowledgement signal.

8. The method according to claim 1, wherein the testing device has an image capturing device, which is embodied for capturing an image and for generating image data, which represents the captured image, wherein step c) has the following partial steps:
capturing an image of the fire protection component;
generating image data, which represents the captured image; and
determining a functionality of the fire protection component.

9. An unmanned vehicle for testing at least one fire protection component of a fire protection structure, comprising:
a testing device for performing the test of the at least one fire protection component, wherein the at least one fire protection component comprises:
  (I) one or more fire protection components, each of the one or more fire protection components having a plurality of assigned test positions; and/or
  (II) a plurality of different types of fire protection components, each of the plurality of different types of fire protection components having at least one assigned test position; and
a navigation control unit, which is embodied and/or configured for navigating the unmanned vehicle to the assigned test position of the at least one fire protection component at which the test is to be performed,
wherein the vehicle is embodied and/or configured for performing the test of the at least one fire protection component by the testing device after the vehicle reaches the assigned test position of the at least one fire protection component.

10. The unmanned vehicle according to claim 9, wherein the unmanned vehicle is embodied as an unmanned aircraft, a drone, a robot, or a robot crawler.

11. The unmanned vehicle according to claim 9, wherein the unnamed vehicle has a computer unit, a memory and/or a first signal transmitting and/or receiving unit.

12. The unmanned vehicle according to claim 11, wherein the first signal transmitting and/or receiving unit or a further signal transmitting and/or receiving unit of the unmanned vehicle is embodied for wireless receiving of an identification signal, which represents identification data for characterizing and/or identifying the fire protection component; and the unmanned vehicle is embodied and/or configured for performing the test of the respective fire protection component on the basis of the corresponding identification data.

13. An unmanned vehicle for testing at least one fire protection component of a fire protection structure, comprising:
- a testing device for performing a test of the at least one fire protection component, and
- a navigation control unit, which is embodied and/or configured for navigating the unmanned vehicle to an assigned test position of the at least one fire protection component at which the test is to be performed, wherein the vehicle is embodied and/or configured for performing the test of the at least one fire protection component by the testing device after the unmanned vehicle reaches the at least one fire protection component;
- wherein the unmanned vehicle has a computer unit, a memory and/or a first signal transmitting and/or receiving unit;
- wherein the first signal transmitting and/or receiving unit or a further signal transmitting and/or receiving unit of the unmanned vehicle is embodied for wireless receiving of an identification signal, which represents identification data for characterizing and/or identifying the fire protection component; and the unmanned vehicle is embodied and/or configured for performing the test of the respective fire protection component on the basis of the corresponding identification data, and
- wherein the identification data represents and/or has at least one of: a type of the fire protection component, an article number of the fire protection component, production data of the fire protection component, a production date of the fire protection component, a serial number of the fire protection component, a software version of the fire protection component, a date of the last test of the fire protection component, test parameter data of the fire protection component, position data of the fire protection component, and/or the assigned test position of the fire protection component.

14. The unmanned vehicle according to claim 13, wherein the first signal transmitting and/or receiving unit or the further signal transmitting and/or receiving unit is embodied and/or configured for receiving the identification signal from a radio identification means including an NFC tag or an RFID tag of the fire protection component.

15. The unmanned vehicle according to claim 9, wherein the unmanned vehicle is embodied and/or configured for generating an activation signal when the unmanned vehicle reaches the respective fire protection component and/or the respective assigned test position; and the unmanned vehicle is embodied and/or configured for activating the test of the respective fire protection component, when and/or as soon as the activation signal is generated.

16. The unmanned vehicle according to claim 9, wherein the testing device has an image capturing device, which is embodied and/or configured for capturing an image and for generating corresponding image data of a fire protection component, which has been reached before; and the testing device is embodied and/or configured for determining a functionality of the fire protection component on the basis of the image data.

17. The unmanned vehicle according to claim 9, wherein the testing device has an image capturing device, which is embodied and/or configured for capturing an image and for generating corresponding image data of the fire protection component, which has been reached before; and the vehicle is embodied and/or configured for transmitting the image data by a first signal transmitting and/or receiving unit, to a control center and/or a remote control device.

18. An unmanned vehicle for testing at least one fire protection component of a fire protection structure, comprising:
- a testing device for performing the test of the at least one fire protection component, and
- a navigation control unit, which is embodied and/or configured for navigating the unmanned vehicle to an assigned test position of the at least one fire protection component at which the test is to be performed,
- wherein the unmanned vehicle is embodied and/or configured for performing the test of the at least one fire protection component by the testing device after the unmanned vehicle reaches the at least one fire protection component; and
- wherein the testing device has a checking device for generating a test parameter; the checking device has a test parameter exit for an exit of the test parameter; the checking device comprises one of: an aerosol generator, a gas generator, a source of radiation, a heat generator and/or a switch signal generator; and, for performing the test, the checking device is configured and/or embodied for generating the test parameter, which can be output through the test parameter exit.

19. The unmanned vehicle according to claim 18, wherein the checking device is embodied and/or configured for generating the test parameter after receiving an activation signal,
wherein the test parameter comprises at least one of: an aerosol stream generated by the aerosol generator, and/or a test gas generated by the gas generator, and/or an electromagnetic radiation generated by the source of radiation, and/or a heat radiation generated by the heat generator, and/or a switch signal generated by the switch signal generator.

20. The unmanned vehicle according to claim 18, wherein the checking device is embodied and/or configured for synchronously or sequentially generating two, three or four different test parameters.

21. The unmanned vehicle according to claim 18, wherein the checking device is embodied and/or configured for controlling the generation of the test parameter on the basis of the identification signal including the test parameter data of the respective fire protection component based on a temporal sequence of the generation and/or outputting of the test parameters, provided that a plurality of test parameters is provided.

22. The unmanned vehicle according to claim 18, wherein the checking device has a rotatable, pivotable and/or length-adjustable aligning device, on which the test parameter exit is arranged, and wherein the checking device is embodied and/or configured for controlling the aligning device, in order to align the test parameter exit to or relative to the respective fire protection component, and wherein the test parameter exit is arranged on an end section of the aligning device facing away from the vehicle.

23. The unmanned vehicle according to claim 18, wherein the unmanned vehicle has a shielding device, wherein the shielding device embodies a defined test parameter propagation volume around the fire protection component.

24. The unmanned vehicle according to claim 23, wherein the unmanned vehicle comprises a drone, which has rotary wings, the shielding device has a projection surface perpendicular to the axes of rotation of the rotary wings, which at least partially overlaps the surface passed over by the rotary wings, viewed in the direction of the axes of rotation of the rotary wings.

25. The unmanned vehicle according to claim 24,
wherein the shielding device has a first shielding element and a second shielding element, wherein the first shielding element is embodied for embodying the defined test parameter propagation volume, and the second shielding element has the projection surface perpendicular to the axes of rotation of the rotary wings, which at least partially overlaps the surface passed over by the rotary wings, viewed in the direction of the axes of rotation of the rotary wings.

26. A fire protection system having:
a fire protection structure comprising at least one fire protection component;
an unmanned vehicle according to claim 9; and
a control center and/or a remote control device;
wherein the unmanned vehicle is embodied and/or configured for carrying out a method for testing the at least one fire protection component of the fire protection structure.

27. A fire protection system comprising:
a fire protection structure comprising at least one fire protection component;
an unmanned vehicle comprising a testing device for performing a test of the at least one fire protection component, and a navigation control unit, which is embodied and/or configured for navigating the unmanned vehicle to the at least one fire protection component at which the test is to be performed, wherein the vehicle is embodied and/or configured for performing the test of the at least one fire protection component by the testing device after the unmanned vehicle reaches the at least one fire protection component of the fire protection structure, and
a control center and/or a remote control device;
wherein the fire protection component is embodied as a fire detector and the unmanned vehicle has a testing device comprising a checking device,
wherein the checking device is embodied and/or configured for generating a test parameter,
wherein the fire detector is further embodied and/or configured for generating a fire detector signal and/or a light signal of an optical display device of the fire detector after a detection of the test parameter,
wherein the fire detector signal is transmitted to the control center having a fire detector and/or extinguishing control center, and the control center is embodied and/or configured for capturing this fire detector signal as a test acknowledgement signal, and
wherein the control center is further embodied and/or configured for being switched into a test mode prior to testing the at least one fire protection component, and the testing device of the unmanned vehicle has an image capturing device, which captures the light signal of the optical display device at the fire detector.

* * * * *